(12) United States Patent
Yokoyama

(10) Patent No.: US 10,133,077 B2
(45) Date of Patent: Nov. 20, 2018

(54) LUMINOUS FLUX DIAMETER ENLARGING ELEMENT AND DISPLAY APPARATUS

(71) Applicant: Seiko Epson Corporation, Tokyo (JP)

(72) Inventor: Osamu Yokoyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 60 days.

(21) Appl. No.: 15/336,306

(22) Filed: Oct. 27, 2016

(65) Prior Publication Data

US 2017/0131552 A1    May 11, 2017

(30) Foreign Application Priority Data

Nov. 5, 2015   (JP) ................................. 2015-217346

(51) Int. Cl.
| | |
|---|---|
| G02B 5/18 | (2006.01) |
| G02B 27/01 | (2006.01) |
| F21V 8/00 | (2006.01) |

(52) U.S. Cl.
CPC ....... G02B 27/0172 (2013.01); G02B 5/1866 (2013.01); G02B 6/0016 (2013.01); G02B 6/0035 (2013.01); G02B 6/0076 (2013.01); G02B 5/1814 (2013.01); G02B 2027/0125 (2013.01)

(58) Field of Classification Search
CPC .............. G02B 5/18; G02B 2005/1804; G02B 5/1842; G02B 5/1866; G02B 27/09; G02B 27/0938; G02B 27/0944; G02B 27/42; G02B 27/4205; G02B 27/4222; G02B 27/4272; G02B 27/4277

USPC ................ 359/558, 566, 569, 571, 574, 576
See application file for complete search history.

(56) References Cited

U.S. PATENT DOCUMENTS

| | | | |
|---|---|---|---|
| 5,742,262 | A | 4/1998 | Tabata et al. |
| 2002/0122015 | A1 | 9/2002 | Song et al. |
| 2006/0126179 | A1 | 6/2006 | Levola |
| 2006/0126181 | A1 | 6/2006 | Levola |

(Continued)

FOREIGN PATENT DOCUMENTS

| | | |
|---|---|---|
| JP | 07-072422 A | 3/1995 |
| JP | 2002-277818 A | 9/2002 |

(Continued)

*Primary Examiner* — Arnel C Lavarias
(74) *Attorney, Agent, or Firm* — ALG Intellectual Property, LLC

(57) ABSTRACT

In a luminous flux diameter expanding element, a light guide body includes an incident-side diffraction grating (first incident-side diffraction grating) provided on a surface thereof and an exit-side diffraction grating (first exit-side diffraction grating) provided on another surface thereof. The incident-side diffraction grating and the exit-side diffraction grating have the same grating direction and the same grating period. The diffraction angle of a positive first-order diffracted light and the diffraction angle of a negative first-order diffracted light of a beam incident on the incident-side diffraction grating are greater than or equal to a critical angle determined by the refractive index of the light guide body. The positive first-order diffracted light and the negative first-order diffracted light of the beam diffracted by the incident-side diffraction grating propagate in opposite directions along a y-direction within the light guide body and are emitted from the exit-side diffraction grating.

19 Claims, 12 Drawing Sheets

(56) References Cited

U.S. PATENT DOCUMENTS

| | | | |
|---|---|---|---|
| 2007/0188837 A1 | 8/2007 | Shimizu et al. | |
| 2009/0190222 A1 | 7/2009 | Simmonds et al. | |
| 2010/0165465 A1* | 7/2010 | Levola | G02B 27/0081 359/576 |
| 2010/0296163 A1* | 11/2010 | Saarikko | G02B 5/1814 359/567 |
| 2012/0087007 A1 | 4/2012 | Suganuma | |
| 2013/0070207 A1* | 3/2013 | Korenaga | G02B 17/004 353/31 |
| 2016/0124229 A1* | 5/2016 | Yokoyama | G02B 27/0172 359/567 |
| 2016/0139407 A1* | 5/2016 | Yokoyama | G02B 27/0081 359/207.7 |

FOREIGN PATENT DOCUMENTS

| | | |
|---|---|---|
| JP | 2007-219106 A | 8/2007 |
| JP | 2008-523434 A | 7/2008 |
| JP | 2008-523435 A | 7/2008 |
| JP | 2009-539128 A | 11/2009 |
| JP | 2010-032997 A | 2/2010 |
| JP | 2011-002778 A | 1/2011 |
| WO | WO-2010-146856 A | 12/2010 |

\* cited by examiner

LUMINOUS FLUX DIAMETER ENLARGING ELEMENT AND DISPLAY APPARATUS

BACKGROUND

1. Technical Field

The present invention relates to a luminous flux diameter expanding element for expanding a luminous flux and a display apparatus that includes the luminous flux diameter expanding element.

2. Related Art

In retinal scanning type display apparatuses that cause a light-modulated luminous flux to be incident on a user's eye, if the luminous flux diameter is small, a change in the position of the user's pupil will likely result in a luminous flux failing to be incident on the pupil and therefore forming an image with a missing region or the like. Therefore, a retinal scanning type display apparatus is provided with a luminous flux diameter expanding element (pupil expanding element). Examples of such luminous flux diameter expanding elements proposed in JP-A-7-72422 and JP-A-2007-219106 have a configuration in which each of two mutually facing surfaces of a light guide body is provided with a diffraction grating and the grating periods of the two diffraction gratings have been made equal so as to have the same diffraction angle. In JP-A-7-72422, the two diffraction gratings face each other and both positive first-order diffracted light and negative first-order diffracted light are utilized. In JP-A-2007-219106, the two diffraction gratings are apart from each other in the extending direction of the light guide body so that one of positive first-order diffracted light and negative first-order diffracted light is utilized.

In the luminous flux diameter expanding element described in JP-A-7-72422, light diffracted by the incident-side diffraction grating immediately exits through the exit-side diffraction grating. Therefore, the luminous flux diameter is expanded merely corresponding to the diffraction angle of the diffraction gratings and it is difficult to greatly expand the luminous flux diameter. On the other hand, in the luminous flux diameter expanding element described in JP-A-2007-219106, light diffracted by the incident-side diffraction grating exits through the exit-side diffraction grating while reflecting within the light guide body. Therefore, the luminous flux diameter can be greatly expanded. However, because the luminous flux diameter expanding element described in JP-A-2007-219106 employs a volume phase type holographic diffraction optical element, incident light is strongly diffracted only in a specific direction and is then utilized. Thus, the luminous flux can be expanded only to one side. Hence, a considerably large incident-side diffraction grating is needed as well as a large exit-side diffraction grating, giving rise to a problem that the luminous flux diameter expanding element has an increased size.

SUMMARY

An advantage of some aspects of the embodiment is that a luminous flux diameter expanding element capable greatly expanding the luminous flux diameter while restraining size increase of the luminous flux diameter expanding element and a display apparatus that includes the luminous flux diameter expanding element.

A luminous flux diameter expanding element according to a first aspect of the embodiment includes a first light guide body that has a first surface and a second surface that is a surface on an opposite side to the first surface, a first incident-side diffraction grating provided on the first surface, and a first exit-side diffraction grating provided on the second surface. The first surface is parallel to the second surface. The first incident-side diffraction grating and the first exit-side diffraction grating are provided so as to have mutually equal grating directions and mutually equal grating periods. The first light guide body has such a refractive index that when a first beam is incident on the first incident-side, a diffraction angle of a positive first-order diffracted light of the first beam and the diffraction angle of a negative first-order diffracted light of the first beam are each greater than or equal to a critical angle. When it is assumed that a direction that intersects with the grating direction of the first incident-side diffraction grating is a first direction, the positive first-order diffracted light and the negative first-order diffracted light of the first beam diffracted by the first incident-side diffraction grating are caused to propagate in mutually opposite directions along the first direction within the first light guide body and are emitted from the first exit-side diffraction grating.

In this aspect of the embodiment, since the positive first-order diffracted light and the negative first-order diffracted light diffracted by the first incident-side diffraction grating propagate in the mutually opposite directions along the first direction in the light guide body and are emitted from the first exit-side diffraction grating, the luminous flux diameter is sufficiently expanded when the luminous flux is emitted from the first exit-side diffraction grating. Therefore, the size increase of the luminous flux diameter expanding element can be restrained therefore the light use efficiency is high. Furthermore, since the diffraction angle of the positive first-order diffracted light and the diffraction angle of the negative first-order diffracted light of the first beam are each greater than or equal to the critical angle determined by the refractive index of the first light guide body, the diffracted lights propagate within the light guide body in a total reflection state and therefore the light use efficiency is high.

The foregoing luminous flux diameter expanding element may further include a second light guide body that has a third surface that is provided so as to face the second surface of the first light guide body and a fourth surface that is a surface on an opposite side to the third surface, a second incident-side diffraction grating provided on the third surface, and a second exit-side diffraction grating provided on the fourth surface. The third surface may be parallel to the fourth surface. The second incident-side diffraction grating and the second exit-side diffraction grating may be provided so as to have mutually equal grating directions and mutually equal grating periods. The grating direction of the second incident-side diffraction grating may be equal to the grating direction of the first incident-side diffraction grating. The grating period of the second incident-side diffraction grating may be different from the grating period of the first incident-side diffraction grating. The second light guide body may have such a refractive index that when a second beam different in wavelength from the first beam is incident on the second incident-side diffraction grating, the diffraction angle of the positive first-order diffracted light of the second beam and the diffraction angle of the negative first-order diffracted light of the second beam are each greater than or equal to the critical angle. The positive first-order diffracted light and the negative first-order diffracted light of the second beam diffracted by the second incident-side diffraction grating may be caused to propagate in the mutually opposite directions along the first direction within the second light guide body and may be emitted from the second exit-side diffraction grating.

The foregoing luminous flux diameter expanding element may further include a third light guide body that has a fifth surface that faces the fourth surface of the second light guide body and a sixth surface that is a surface on an opposite side to the fifth surface, a third incident-side diffraction grating provided on the fifth surface, and a third exit-side diffraction grating provided on the sixth surface. The fifth surface may be parallel to the sixth surface. The third incident-side diffraction grating and the third exit-side diffraction grating may be provided so as to have mutually equal grating directions and mutually equal grating periods. The grating direction of the third incident-side diffraction grating may be equal to the grating direction of the first incident-side diffraction grating. The grating period of the third incident-side diffraction grating may be different from the grating period of the first incident-side diffraction grating and the grating period of the second incident-side diffraction grating. The third light guide body may have such a refractive index that when a third beam different in wavelength from the first beam and the second beam is incident on the third incident-side diffraction grating, the diffraction angle of the positive first-order diffracted light of the third beam and the diffraction angle of the negative first-order diffracted light of the third beam are each greater than or equal to a critical angle. The positive first-order diffracted light and the negative first-order diffracted light of the third beam diffracted by the third incident-side diffraction grating may be caused to propagate in the mutually opposite directions along the first direction within the third light guide body and may be emitted from the third exit-side diffraction grating.

In the foregoing luminous flux diameter expanding element, when it is assumed that the grating period of the first incident-side diffraction grating is P1, and that the grating period of the second incident-side diffraction grating is P2, and that the grating period of the third incident-side diffraction grating is P3, the grating period P1, the grating period P2, and the grating period P3 may satisfy the following relation:

$$P1<P2<P3$$

According to this configuration, when the wavelengths of the first beam, the second beam, and the third beam have the following relation:

first beam<second beam<third beam then the emission intervals of the first to third beams can be made equal to each other, so that uniformity in the amount and color of outgoing light can be improved.

In the foregoing luminous flux diameter expanding element, when it is assumed that a grating height of the first incident-side diffraction grating is H11, and that the grating height of the second incident-side diffraction grating is H21, and that the grating height of the third incident-side diffraction grating is H31, the grating height H11, the grating height H21, and the grating height H31 may satisfy the following relation:

$$H11<H21<H31$$

According to this configuration, the wavelengths of the first beam, the second beam, and the third beam have the following relation:

first beam<second beam<third beam then the first-order diffraction efficiency of each light guide body for a corresponding one of the beams can be increased. Hence, a luminous flux expanding element with high brightness can be provided and unnecessary diffracted light can be restrained.

In the foregoing luminous flux diameter expanding element, when it is assumed that the grating height of the first exit-side diffraction grating is H12, and that the grating height of the second exit-side diffraction grating is H22, and that the grating height of the third exit-side diffraction grating is H32, the grating height H11, the grating height H12, the grating height H21, the grating height H22, the grating height H31, and the grating height H32 may satisfy the following relation:

$$H12<H11<H22<H21<H32<H31$$

According to this configuration, light is emitted from the exit-side diffraction gratings in a dispersed state, so that the distribution of amounts of light emitted can be made appropriate.

In the foregoing luminous flux diameter expanding element, when it is assumed the grating period of the first incident-side diffraction grating and the first exit-side diffraction grating is P, and that a shortest wavelength in a spectrum of the first beam in terms of half-width is $\lambda c$, and that a maximum incident angle of the first beam with respect to the first incident-side diffraction grating is $\theta max$, the grating period P, the shortest wavelength $\lambda c$, and the maximum incident angle $\theta max$ may satisfy the following relation:

$$P \le \lambda c/[\sin(\theta max)+1]$$

A display apparatus according to a second aspect of the embodiment includes any one of the foregoing luminous flux diameter expanding elements according to the first aspect of the embodiment, an image light projection apparatus that includes an image generation apparatus and a collimator lens and that causes image light generated by the image generation apparatus to be incident on the luminous flux diameter expanding element via the collimator lens and a light guide optical system that guides the image light emitted from the luminous flux diameter expanding element into a second direction that intersects with the first direction.

In the foregoing display apparatus, an exit pupil of the image light projection apparatus may be positioned between an incident surface of the luminous flux diameter expanding element and an exit surface of the luminous flux diameter expanding element.

In the foregoing display apparatus, the exit pupil may be positioned at an intermediate position between the incident surface and the exit surface of the luminous flux diameter expanding element.

Furthermore, in the foregoing display apparatus, a size of the luminous flux diameter expanding element in the first direction may be smaller than the size of the light guide optical system in the first direction. According to this configuration, the display apparatus can be reduced in size.

Still further, in the foregoing display apparatus, the first direction may be a vertical direction relative to the display apparatus and the second direction may be a lateral direction relative to the display apparatus.

Yet further, in the foregoing display apparatus, the first direction may be a lateral direction relative to the display apparatus and the second direction may be a vertical direction relative to the display apparatus.

BRIEF DESCRIPTION OF THE DRAWINGS

The embodiment will be described with reference to the accompanying drawings, wherein like numbers reference like elements.

DESCRIPTION OF EXEMPLARY EMBODIMENTS

Figure 1:
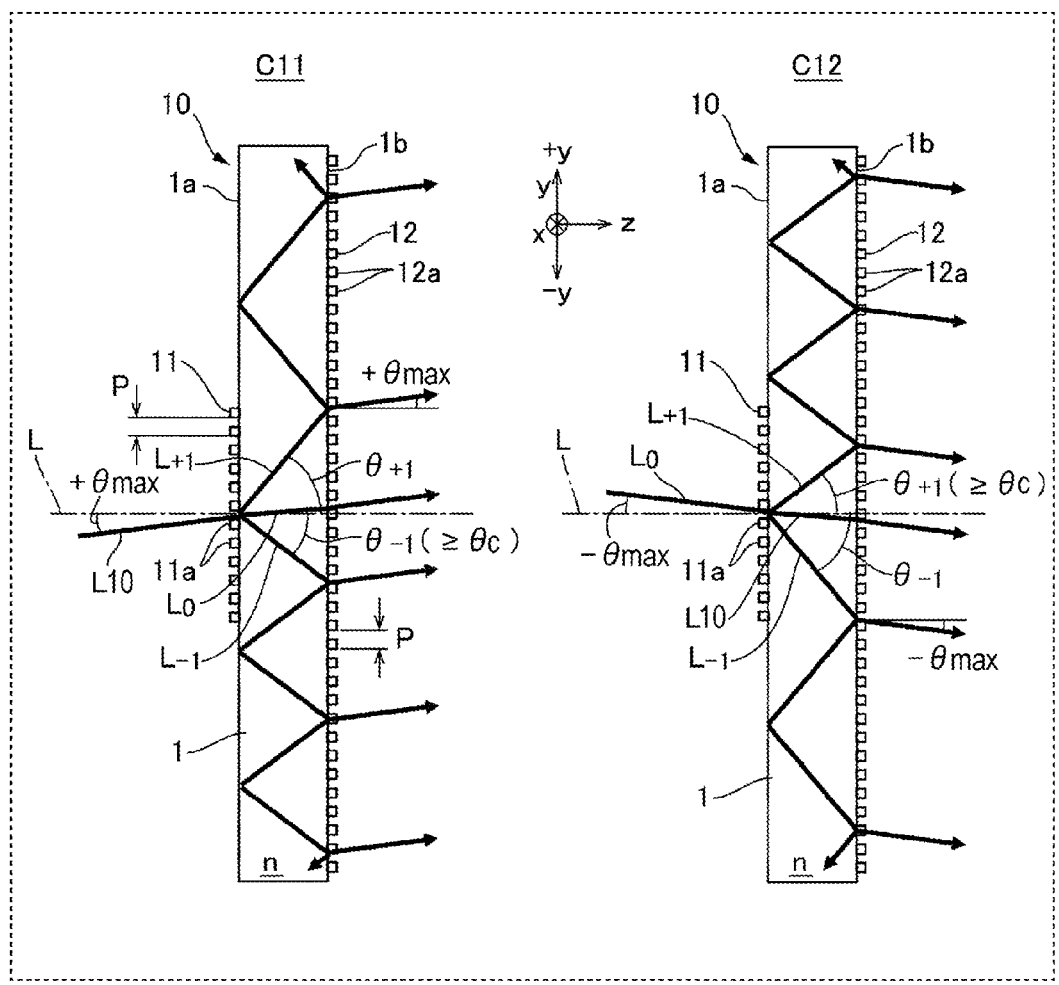
FIG. 1 is an illustrative diagram showing a form of a luminous flux diameter expanding element according to Exemplary Embodiment 1.

Exemplary embodiments will be described below. Note that, in the drawings that will be referred to in the following description, scales are different for various members and the like in the drawings so that the individual members and the like illustrated have such sizes as to be easily recognizable. Furthermore, the following description assumes that a direction in which the gratings of diffraction gratings extend is an x-direction, directions orthogonal to the x-direction are y-directions, and a direction orthogonal to the x-direction and the y-directions is a z-direction. Therefore, in this embodiment, the "first direction" corresponds to the x-direction and the diffraction direction of a diffraction grating ("second direction") corresponds to the y-direction.

Exemplary Embodiment 1
Basic Configuration

Figure 2:
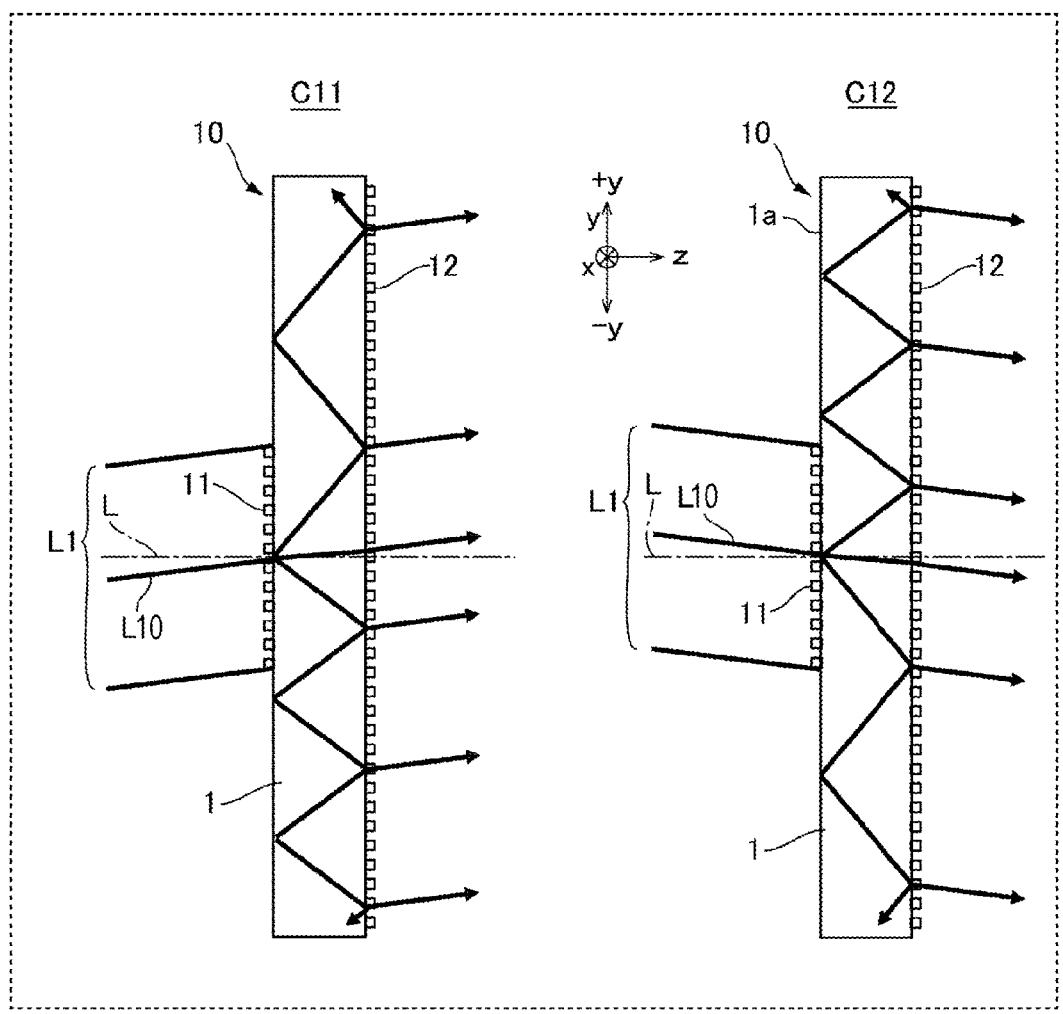
FIG. 2 is an illustrative diagram for a case where an image light is incident on the luminous flux diameter expanding element shown in FIG. 1.

FIG. 1 is an illustrative diagram showing a form of a luminous flux diameter expanding element according to Exemplary Embodiment 1. FIG. 2 is an illustrative diagram for a case where image light is incident on the luminous flux diameter expanding element shown in FIG. 1. Note that, in each of FIG. 1 and FIG. 2, a left portion of the drawing shows a case C11 where light of a wavelength λc is incident at an incident angle +θmax and a right portion of the drawing shows a case C12 where light of the wavelength λc is incident at an incident angle −θmax.

As shown in FIG. 1, a luminous flux diameter expanding element 10 of this exemplary embodiment includes one light guide body 1. In the luminous flux diameter expanding element 10, the light guide body 1 corresponds to a "first light guide body" in the embodiment. The light guide body 1 is a parallel flat plate made of a glass or an optical resin whose refractive index is n. A surface 1a (first surface) of the light guide body 1 is provided with an incident-side diffraction grating 11 (first incident-side diffraction grating) and a surface 1b (second surface) thereof that is parallel to and faces the surface 1a is provided with an exit-side diffraction grating 12 (first exit-side diffraction grating). In the incident-side diffraction grating 11, a plurality of gratings 11a that extend in the x-direction perpendicular to the plane of the drawing are spaced equidistantly in the y-directions from each other. In the exit-side diffraction grating 12, a plurality of gratings 12a that extend in the x-direction perpendicular to the plane of the drawing are spaced equidistantly in the y-directions from each other.

In the luminous flux diameter expanding element 10 configured as described above, the incident-side diffraction grating 11 and the exit-side diffraction grating 12 are formed in regions that are superposed when viewed in the direction of an optical axis L. Note that the exit-side diffraction grating 12 is larger in area than the incident-side diffraction grating 11 and, more specifically, the region in which the exit-side diffraction grating 12 has been formed is broader in the mutually opposite y-directions than the region in which the incident-side diffraction grating 11 has been formed. Therefore, the luminous flux diameter expanding element 10 is capable of diffracting a beam L10 (first beam) coming in from the in-coming side diffraction grating 11, propagating the diffracted beam in the opposite y-directions within the light guide body 1 and allowing the beam to go out through the exit-side diffraction grating 12. Therefore, the luminous flux diameter expanding element 10 is capable of exit pupil expanding of the image light made of the beam L10 in the y-directions. The exit pupil expanding herein means acquisition of a plurality of outgoing beams that go out at an angle equal to the incident angle of the incoming beam but from positions different from the incident position of the incoming beam, that is, duplications of a beam with a conserved angle.

In this exemplary embodiment, the incident-side diffraction grating 11 and the exit-side diffraction grating 12 are surface relief type diffraction gratings and the incident-side diffraction grating 11 and the exit-side diffraction grating 12 are the same in grating direction and in grating period. Because the incident-side diffraction grating 11 and the exit-side diffraction grating 12 have the same grating period P, it is possible to obtain diffracted light that goes out at an angle equal to the incident angle.

Assuming herein that the maximum view angle of a screen defining the size thereof in terms of half angle is θmax, the incident angle of incoming light of an image incident on the incident-side diffraction grating 11 ranges between −θmax and +θmax. Furthermore, this exemplary embodiment is focused on, of the diffracted light, positive first-order diffracted light $L_{+1}$ and negative first-order diffracted light $L_{-1}$ whose diffraction efficiency can be increased. Incidentally, although there also occurs zero-order diffracted light $L_0$, the zero-order diffracted light $L_0$ does not contribute to pupil expanding and it is preferable to make the zero-order diffraction efficiency low.

In the luminous flux diameter expanding element 10 of this exemplary embodiment, a plurality of light beams outgoing at an angle equal to the incident angle are produced on both sides in the y directions. Therefore, both the positive first-order diffracted light $L_{+1}$ that propagates in a positive y-direction and the negative first-order diffracted light $L_{-1}$ that propagates in the negative y-direction need to propagate within the light guide body 1 by total reflection.

In order for the positive first-order diffracted light $L_{+1}$ and the negative first-order diffracted light $L_{-1}$ to propagate within the light guide body 1 by total reflection, both the diffraction angles of the positive first-order diffracted light $L_{+1}$ and the negative first-order diffracted light $L_{-1}$ need to be greater than a critical angle that is determined by the refractive index n of the light guide body 1. As shown in the case C11, of the beam L10 incident at the incident angle of $+\theta max$, the diffracted light whose diffraction angle becomes smaller is the negative first-order diffracted light $L_{-1}$. Therefore, if the absolute value of the diffraction angle $\theta_{-1}$ of the negative first-order diffracted light $L_{-1}$ is larger than the critical angle $\theta c$, the diffraction angle $\theta_{+1}$ of the positive first-order diffracted light $L_{+1}$ is always larger than the critical angle $\theta c$.

Furthermore, provided that the grating period P is constant, the diffraction angle depends on the wavelength of incident light, that is, the shorter the wavelength, the smaller the diffraction angle. Therefore, if, in the spectrum of image light that is propagated in the light guide body 1, the absolute value of the diffraction angle $\theta_{-1}$ of the negative first-order diffracted light $L_{-1}$ of the shortest wavelength $\lambda c$ that effectively contributes to image display is larger than the critical angle $\theta c$, light over the entire spectrum of image light can be propagated in both the positive y-direction and the negative y-direction.

In the case C12 where the incident angle of image light is $-\theta max$, if the incident angle is changed from $+\theta max$ to $-\theta max$, the diffraction angle $\theta_{-1}$ of the negative first-order diffracted light $L_{-1}$ gradually increases in the negative direction and the propagation in the negative y-direction by total reflection is maintained. On the other hand, although the diffraction angle $\theta_{+1}$ of the positive first-order diffracted light $L_{+1}$ gradually decreases, the diffraction angle $\theta_{+1}$ remains larger than the critical angle $\theta c$ even when the incident angle becomes equal to $-\theta max$. This can be seen by inverting the illustration of the case C11 upside down because the light guide body 1 and the diffraction gratings are disposed symmetrically about the optical axis L. Therefore, the propagation in the positive y-direction by total reflection is maintained.

The conditions that enable the propagation by total reflection in both the positive y-direction and the negative y-direction will be illustrated below by mathematical expressions. First, where the wavelength of incoming light (beam L10) is $\lambda c$, the incident angle is $\theta max$, the refractive index of the light guide body 1 is n, and the diffraction angle of the negative first-order diffracted light $L_{-1}$ within the light guide body 1 is $\theta_{-1}$, the grating period P that makes the diffraction angle $\theta_{-1}$ equal to the critical angle $\theta c$ is given by the following expression:

$$P=\lambda c/[\sin(\theta max)+1] \quad (1)$$

Note that if the grating period P is smaller than the value given by the expression (1), the diffraction angle $\theta_{-1}$ of the negative first-order diffracted light $L_{-1}$ is larger than the critical angle $\theta c$. Therefore, in order for the image light (beam L10) incident on the incident-side diffraction grating 11 to propagate in both the positive y-direction and the negative y-direction by total reflection, it suffices that the following conditional expression is satisfied.

$$P \leq \lambda c/[\sin(\theta max)+1] \quad (2)$$

On the other hand, when the grating period P is fixed, the diffraction angle $\theta m$ (m is the diffraction order) by the incident-side diffraction grating 11 can be found by the following expression where $\lambda$ is the incident wavelength and $\theta i$ is the incident angle.

$$\theta m = \sin^{-1}\{[\sin(\theta i)+m(\lambda/P)]/N\} \quad (3)$$

Although in FIG. 1, the image light is represented by a line (beam L), the image light L1 is actually a luminous flux that has a spatial spread as shown in FIG. 2. Therefore, the size of the region in which the incident-side diffraction grating 11 has been provided is preferably equal to the size of the luminous flux of the image light L1.

Concrete Configuration Example

Figure 3:
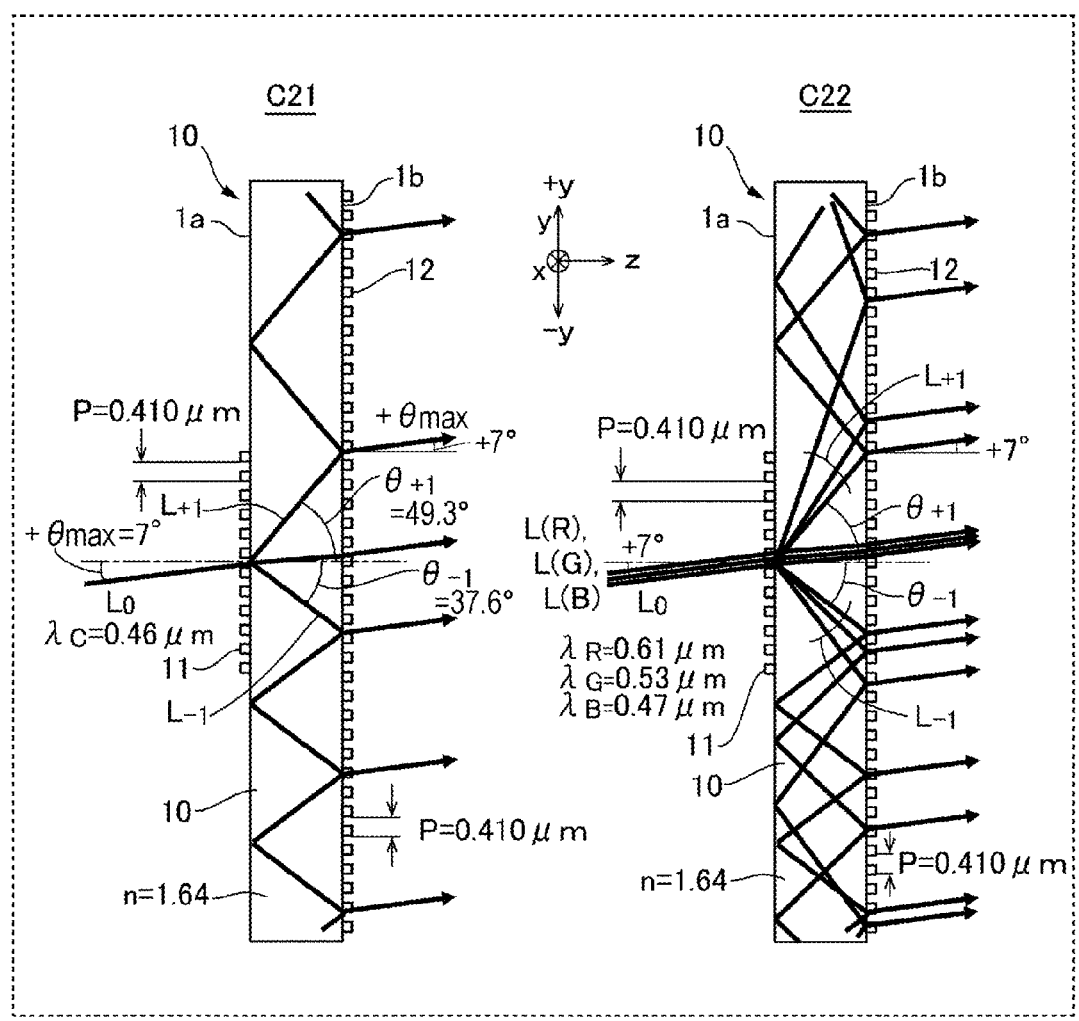
FIG. 3 is an illustrative diagram showing a concrete configuration example of the luminous flux diameter expanding element according to Exemplary Embodiment 1.

FIG. 3 is an illustrative diagram showing a concrete configuration example of the luminous flux diameter expanding element 10 according to Exemplary Embodiment 1. In FIG. 3, a left portion of the drawing shows a case C21 where light of the shortest wavelength $\lambda c$ (0.46 nm) is incident and a right portion of the drawing shows a case C22 where red light L(R) of a wavelength $\lambda R$ (0.61 nm), green light L(G) of a wavelength $\lambda G$ (0.53 nm), and blue light L(B) of a wavelength $\lambda B$ (0.4747 nm) are incident.

First, on the basis of the case C21, the grating period of the incident-side diffraction grating 11 and the exit-side diffraction grating 12 is determined. It is assumed that the shortest wavelength $\lambda c$ needed for image display in the spectrum of image light is 0.46 μm and the half angle $+\theta max$ of the maximum view angle is 7°. If the refractive index n of the light guide body 1 is 1.64, the critical angle $\theta c$ is 37.6°. It is also assumed herein that the wavelength dependence of the refractive index n of the light guide body 1 is very small.

If the grating period P of the incident-side diffraction grating 11 and the exit-side diffraction grating 12 is determined so that the diffraction angle $\theta_{-1}$ of the negative first-order diffracted light $L_{-1}$ becomes equal to the critical angle $\theta c$, P=0.410 μm is given by the expression (1). In the case C22 where lights having wavelengths $\lambda R$, $\lambda G$ and $\lambda B$ are incident on the light guide body 1 provided with the incident-side diffraction grating 11 and the exit-side diffraction grating 12, each of the incoming lights, that is, each of the red light L(R) of the wavelength $\lambda R$, the green light L(G) of the wavelength $\lambda G$, and the blue light L(B) of the wavelength $\lambda B$, produces diffracted lights due to the incident-side diffraction grating 11. The diffracted lights propagate in the positive y-direction and the negative y-direction within the light guide body 1 and exit through the exit-side diffraction grating 12 at an exit angle of 7°. The diffraction angle $\theta_{+1}$ (positive first-order diffraction angle) of the positive first-order diffracted light $L_{+1}$ and the diffraction angle $\theta_{-1}$ (negative first-order diffraction angle) of the negative first-order diffracted light $L_{-1}$ at that time are shown in Table 1.

TABLE 1

| Incident angle | Color of image light | Wavelength | Positive first-order diffraction angle | Negative first-order diffraction angle |
|---|---|---|---|---|
| +7° | Blue | 0.47 μm | 50.7° | −38.7° |
|  | Green | 0.53 μm | 59.6° | −45.6° |
|  | Red | 0.61 μm | 78.9° | −56.4° |

As shown in Table 1, any one of the lights having the wavelengths $\lambda R$, $\lambda G$ and $\lambda B$ has a diffraction angle whose absolute value exceeds the critical angle of 37.6°, so that the incoming light (first beam) can be propagated in both the positive y-direction and the negative y-direction by total reflection in the light guide body 1 and be allowed to exit through the exit-side diffraction grating 12.

Main Advantageous Effects of the Exemplary Embodiment

In the luminous flux diameter expanding element 10 of the exemplary embodiment, because the positive first-order diffracted light $L_{+1}$ and the negative first-order diffracted light $L_{-1}$ of the beam L10 diffracted by the incident-side diffraction grating 11 are propagated in the mutually opposite y-directions (first directions) in the light guide body 1 and are allowed to exit through the exit-side diffraction grating 12, the luminous flux diameter is sufficiently expanded at the time of exit through the exit-side diffraction grating 12. Furthermore, because the incident-side diffraction grating 11 and the exit-side diffraction grating 12 are provided in regions that are superposed when viewed in the direction of the optical axis L, the size increase of the luminous flux diameter expanding element can be restrained. Furthermore, the diffraction angle $\theta_{+1}$ of the positive first-order diffracted light $L_{+1}$ and the diffraction angle $\theta_{-1}$ of the negative first-order diffracted light $L_{-1}$ of the beam L10 are each greater than or equal to the critical angle $\theta c$ determined by the refractive index of the light guide body 1. Therefore, the positive first-order diffracted light $L_{+1}$ and the negative first-order diffracted light $L_{-1}$ propagate within the light guide body 1 in a total reflection state and exit through the exit-side diffraction grating 12. Thus, the light use efficiency is high.

Exemplary Embodiment 2

Configuration of Luminous Flux Diameter Expanding Element 10

Figure 4:
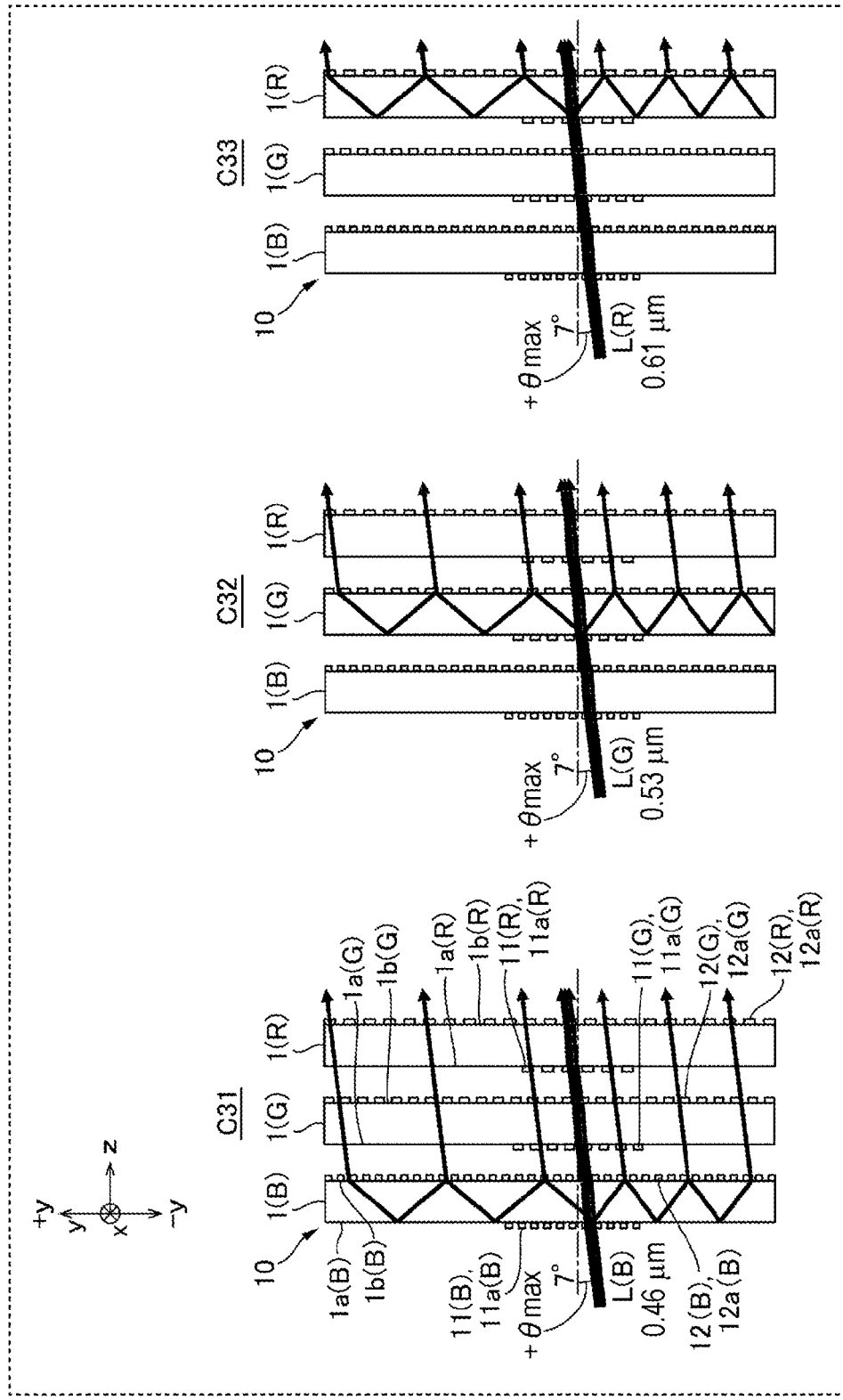
FIG. 4 is an illustrative diagram showing a form of a luminous flux diameter expanding element according to Exemplary Embodiment 2.
Figure 5:
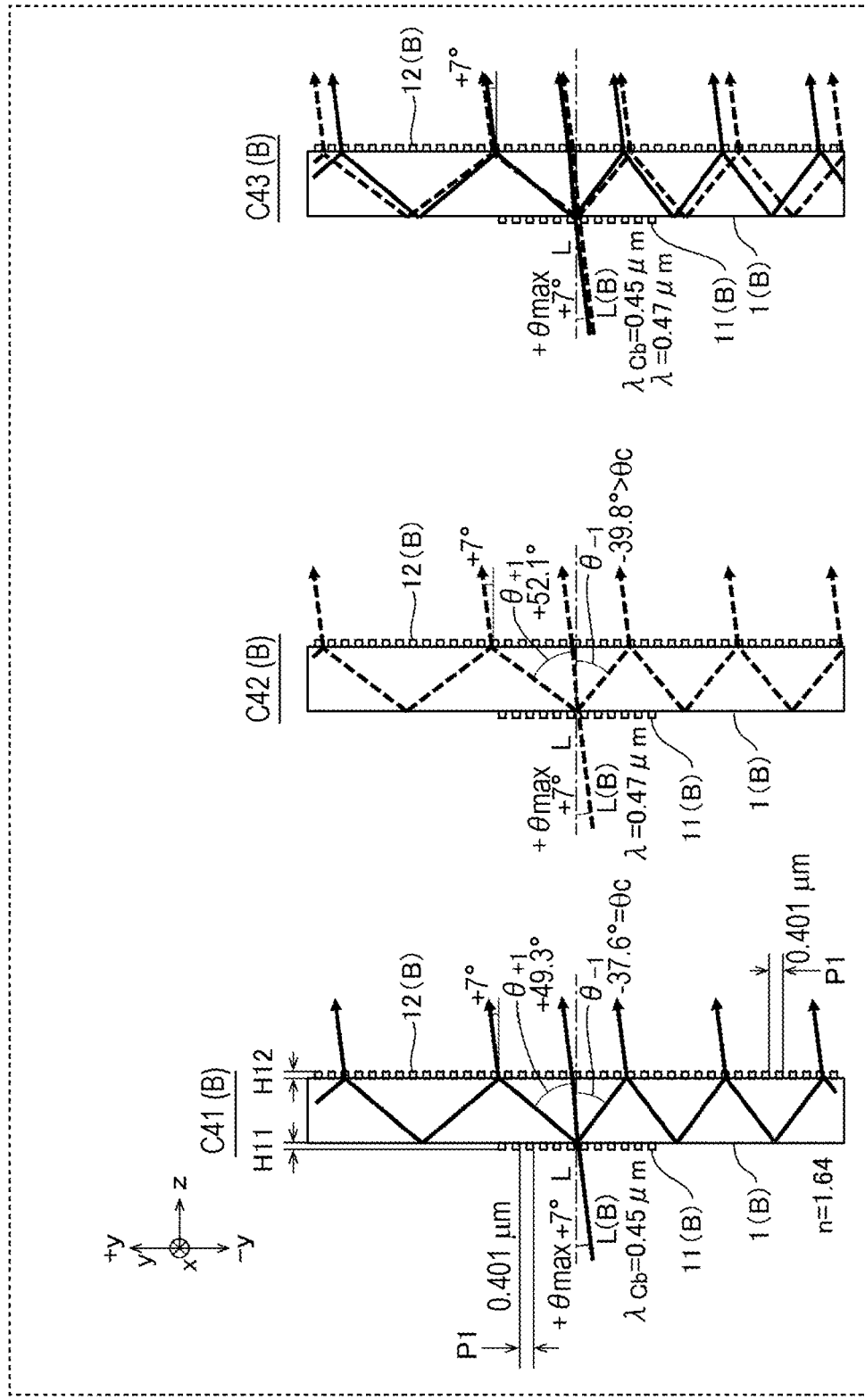
FIG. 5 is an illustrative diagram for a case where blue light is incident on a light guide body for blue color used in the luminous flux diameter expanding element shown in FIG. 4.
Figure 6:
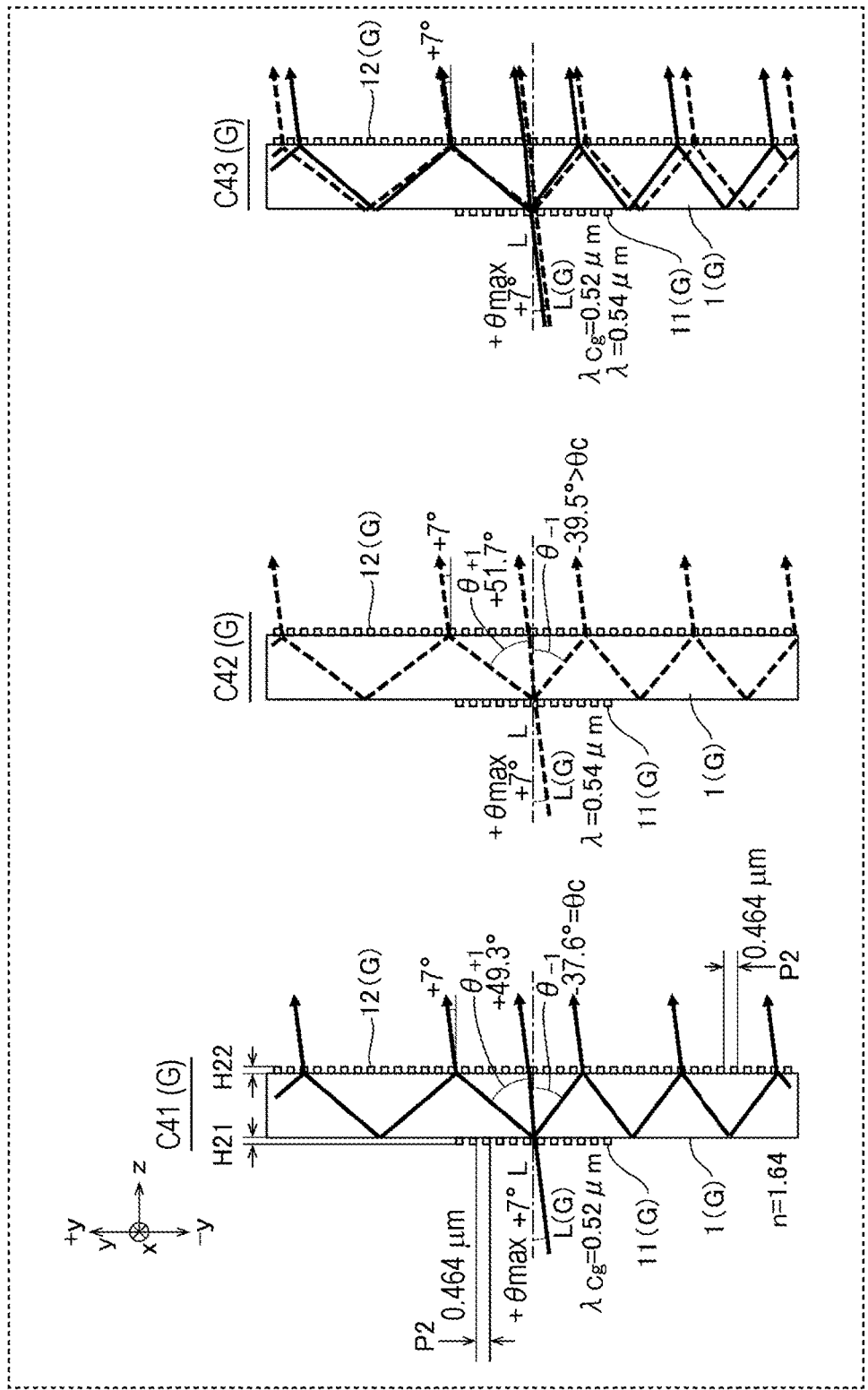
FIG. 6 is an illustrative diagram for a case where green light is incident on a light guide body for green color used in the luminous flux diameter expanding element shown in FIG. 4.
Figure 7:
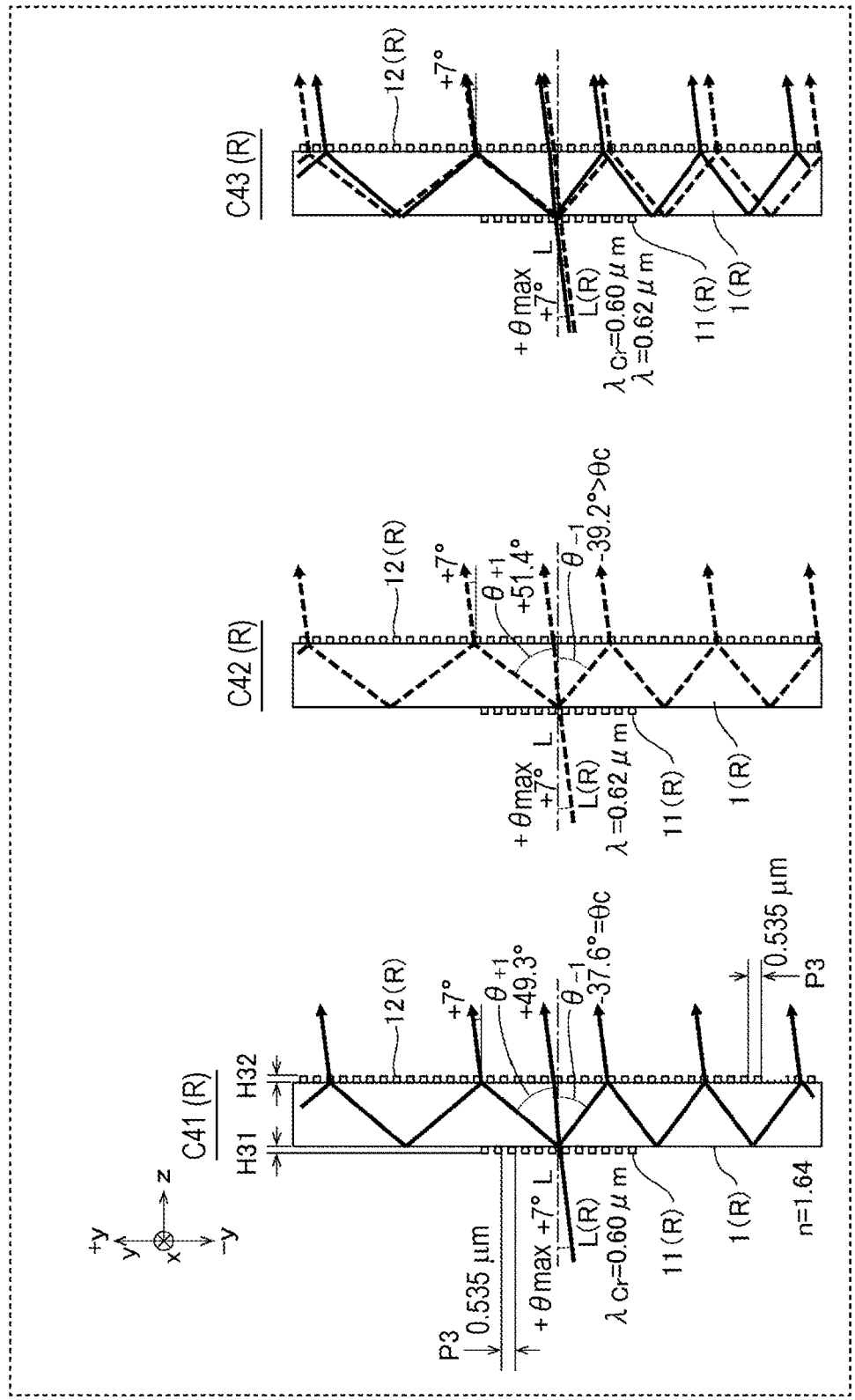
FIG. 7 is an illustrative diagram for a case where red light is incident on a light guide body for red color used in the luminous flux diameter expanding element shown in FIG. 4.

FIG. 4 is an illustrative diagram showing a form of a luminous flux diameter expanding element 10 according to Exemplary Embodiment 2. In FIG. 4, a left portion of the drawing shows a state C31 in which the luminous flux diameter of blue light L(B) is expanded, a right portion of the drawing shows a state C33 in which the luminous flux diameter of red light L(R) is expanded, and a central portion of the drawing shows a state C32 in which the luminous flux diameter of green light L(G) is expanded. FIG. 5 is an illustrative diagram for the case where blue light L(B) is incident on a blue-light guide body 1(B) for blue color used in the luminous flux diameter expanding element 10 shown in FIG. 4. FIG. 6 is an illustrative diagram for the case where green light L(G) is incident on a green-light guide body 1(G) for green color used in the luminous flux diameter expanding element 10 shown in FIG. 4. FIG. 7 is an illustrative diagram for the case where red light L(R) is incident on a red-light guide body 1(R) for red color used in the luminous flux diameter expanding element 10 shown in FIG. 4. In each of FIG. 5, FIG. 6, and FIG. 7, a left portion of the drawing shows a case C41(R), C41(G), or C41(B) in which light of the shortest wavelength in the respective spectrum is incident, a central portion in the drawing shows a case C42(R), C42(G), or C42(B) in which light of the longest wavelength in the respective spectrum is incident, and a right portion of the drawing shows a case C43(R), C43(G), or C43(B) in which light of the shortest wavelength and light of the longest wavelength in the respective spectrum are incident.

As shown in FIG. 4, in the luminous flux diameter expanding element 10 of this exemplary embodiment, the blue-light guide body 1(B), the green-light guide body 1(G), and the red-light guide body 1(R) are disposed in order along the optical axis L from the incident side to the exit side for image light. That is, the light guide bodys 1(B), 1(G), and 1(R) are disposed in order from the shortest to the longest of the wavelengths of light to which the light guide bodies 1(B), 1(G), and 1(R) correspond. In this exemplary embodiment, the blue-light guide body 1(B), the green-light guide body 1(G), and the red-light guide body 1(R) each have substantially the same configuration as the light guide body described above with reference to FIG. 1 to FIG. 3. Furthermore, the light guide bodies 1(B), 1(G), and 1(R) have the same thickness.

In the luminous flux diameter expanding element 10 configured as described above, the blue light L(B), the green light L(G), and the red light L(R) contained in image light pass through the blue-light guide body 1(B), the green-light guide body 1(G), and the red-light guide body 1(R) in order before exiting the luminous flux diameter expanding element 10.

In the luminous flux diameter expanding element 10 of this exemplary embodiment, the light guide body 1(B) has a surface 1a(B) and another surface 1b(B) that is parallel to and faces the surface 1a(B). The surface 1a(B) is provided with an incident-side diffraction grating 11(B) whose gratings 11a(B) extend in the x-direction. The surface 1b(B) is provided with an exit-side diffraction grating 12(B) whose gratings 12a(B) extend in the x-direction. The incident-side diffraction grating 11(B) and the exit-side diffraction grating 12(B) are the same in grating direction and in grating period.

The light guide body 1(G) has on its side toward the light guide body 1(B) a surface 1a(G) that is parallel to and faces the surface 1b(B) of the light guide body 1(B) and has on its side opposite to the light guide body 1(B) a surface 1b(G) that is parallel to and faces the surface 1a(G). The surface 1a(G) is provided with an incident-side diffraction grating 11(G) whose gratings 11a(G) extend in the x-direction. The surface 1b(G) is provided with an exit-side diffraction grating 12(G) whose gratings 12a(G) extend in the x-direction. The incident-side diffraction grating 11(G) and the exit-side diffraction grating 12(G) have the same grating direction and the same grating period. Note that the incident-side diffraction grating 11(G) and the exit-side diffraction grating 12(G) are the same in grating direction as the incident-side diffraction grating 11(B) and the exit-side diffraction grating 12(B) but are different in grating period from the incident-side diffraction grating 11(B) and the exit-side diffraction grating 12(B).

The light guide body 1(R) has on its side toward the light guide body 1(B) a surface 1a(R) that is parallel to and faces the surface 1b(G) of the light guide body 1(G) and has on its side opposite to the light guide body 1(B) a surface 1b(R) that is parallel to and faces the surface 1a(R). The surface 1a(R) is provided with an incident-side diffraction grating 11(R) whose gratings 11a(R) extend in the x-direction. The surface 1b(R) is provided with an exit-side diffraction grating 12(R) whose gratings 12a(R) extend in the x-direction. The incident-side diffraction grating 11(R) and the exit-side diffraction grating 12(R) have the same grating direction and the same grating period. Note that the incident-side diffraction grating 11(R) and the exit-side diffraction grating 12(R) are the same in grating direction as the incident-side diffraction grating 11(B) and the exit-side diffraction grating 12(B) but are different in grating period from the incident-side diffraction grating 11(B), the exit-side diffraction grating 12(B), the incident-side diffraction grating 11(G), and the exit-side diffraction grating 12(G).

In the luminous flux diameter expanding element 10 configured as described above, the foregoing component elements have the following relations to component elements of the embodiment.

The light guide body 1(B) corresponds to a first light guide body.

The surface 1a(B) corresponds to a first surface.

The surface 1b(B) corresponds to a second surface.

The incident-side diffraction grating 11(B) corresponds to a first incident-side diffraction grating.

The exit-side diffraction grating 12(B) corresponds to a first exit-side diffraction grating.

The light guide body 1(G) corresponds to a second light guide body.

The surface 1a(G) corresponds to a third surface.

The surface 1b(G) corresponds to a fourth surface.

The incident-side diffraction grating 11(G) corresponds to a second incident-side diffraction grating.

The exit-side diffraction grating 12(G) corresponds to a second exit-side diffraction grating.

The light guide body 1(R) corresponds to a third light guide body.

The surface 1a(R) corresponds to a fifth surface.

The surface 1b(R) corresponds to a sixth surface.

The incident-side diffraction grating 11(R) corresponds to a third incident-side diffraction grating.

The exit-side diffraction grating 12(R) corresponds to a third exit-side diffraction grating.

The blue light L(B) corresponds to a first beam.

The green light L(G) corresponds to a second beam.

The red light L(R) corresponds to a third beam.

With regard to each of the light guide bodies 1(B), 1(G), and 1(R) in the luminous flux diameter expanding element 10 of the exemplary embodiment, the incident angle, the color of diffracted light (corresponding image light color), the grating period, the shortest wavelength of the corresponding color light, the longest wavelength of the corresponding color light, the positive first-order diffraction angle, and the negative first-order diffraction angle are as shown in Table 2.

H12 of the exit-side diffraction grating 12(B), the grating height H21 of the incident-side diffraction grating 11(G), the grating height H22 of the exit-side diffraction grating 12(G), the grating height H31 of the incident-side diffraction grating 11(R), and the grating height H32 of the exit-side diffraction grating 12(R) satisfy the following relation.

$H11 < H21 < H31$ $H12 < H11$ $H22 < H21$ $H32 < H31$ $H12 < H11 < H22 < H21 < H32 < H31$

In the luminous flux diameter expanding element 10 of the exemplary embodiment, as shown in FIG. 4 and FIG. 5, the grating period P1 of the incident-side diffraction grating 11(B) and the exit-side diffraction grating 12(B) of the blue-light guide body 1(B) has been set so that the positive first-order diffracted light $L+1$ and the negative first-order diffracted light $L_{-1}$ of from light of a blue wavelength band (blue light (L(B)) whose incident angle is in the range of ±7° are each diffracted with an angle larger than the critical angle of the light guide body 1(B) and propagate within the light guide body 1(B) in the positive y-direction and the negative y-direction, respectively, from the incident position.

More concretely, the grating period P1 of the incident-side diffraction grating 11(B) and the exit-side diffraction grating 12(B) of the blue-light guide body 1(B) has been set to 0.401 μm, so that the first-order diffraction angle of the shortest wavelength ($\lambda c$=0.45 μm) in the wavelength band of the blue light L(B) equals the critical angle (37.6°) of the blue-light guide body 1(B) (refractive index=1.64). FIG. 5 shows beams in the case C41(B) where light of the shortest wavelength ($\lambda cb$=0.45 μm) in the wavelength band of the blue light L(B) is incident on the blue-light guide body 1(B) and beams in a case C42(B) where light of the longest wavelength (0.47 μm) in the wavelength band of the blue light L(B) is incident on the blue-light guide body 1(B). FIG.

TABLE 2

| | Incident angle | Color of image light | Grating period | Shortest wavelength Longest wavelength | Positive first-order diffraction angle | Negative first-order diffraction angle |
|---|---|---|---|---|---|---|
| Light guide body 1(B) | +7° | Blue | 0.401 μm | 0.45 μm<br>0.47 μm | +49.3°<br>+52.1° | −37.6°<br>−39.8° |
| Light guide body 1(G) | | Green | 0.464 μm | 0.52 μm<br>0.54 μm | +49.3°<br>+51.7° | −37.6°<br>−39.5° |
| Light guide body 1(R) | | Red | 0.535 μm | 0.60 μm<br>0.62 μm | +49.3°<br>+51.4° | −37.6°<br>−39.2° |

In the exemplary embodiment, as can be seen from Table 2, the grating period P1 of the incident-side diffraction grating 11(B) and the exit-side diffraction grating 12(B), the grating period P2 of the incident-side diffraction grating 11(G) and the exit-side diffraction grating 12(G), and the grating period P3 of the incident-side diffraction grating 11(R) and the exit-side diffraction grating 12(R) satisfy the following relation.

$P1 < P2 < P3$

Furthermore, as stated below, the grating height H11 of the incident-side diffraction grating 11(B), the grating height 5 also shows a situation of the case C43(B) combining beams in the case C41(B) where light of the shortest wavelength ($\lambda cb$=0.45 μm) in the wavelength band of the blue light L(B) is incident on the blue-light guide body 1(B) and beams in the case C42(B) where light of the longest wavelength (0.47 μm) in the wavelength band of the blue light L(B) is incident on the blue-light guide body 1(B). As shown in FIG. 5, the shortest wavelength and the longest wavelength in the wavelength band of the blue light L(B) have only a difference of 0.02 μm, so that the difference between the diffraction angles of the shortest and longest wavelengths is small. Hence, the difference between the exit positions of the lights of the shortest and longest wavelengths is small.

Furthermore, as shown in FIG. 5, the grating height H11 of the incident-side diffraction grating 11(B) of the blue-light guide body 1(B) has been set so that the first-order diffraction efficiency is high within the range between the shortest wavelength ($\lambda$cb=0.45 µm) and the longest wavelength (0.47 µm) in the wavelength band of the blue light L(B). Furthermore, the grating height H11 of the incident-side diffraction grating 11(B) has been set to a height such that the first-order diffraction efficiency is high for the blue light L(B) of the wavelength of 0.46 µm incident perpendicularly on the incident-side diffraction grating 11(B) and the diffraction efficiency is low for the green light L(G) and the red light L(R) that are incident perpendicularly on the incident-side diffraction grating 11(B). In this exemplary embodiment, the grating height H11 of the incident-side diffraction grating 11(B) is, for example, about 0.57 µm. Furthermore, the exit-side diffraction grating 12(B) emits the light propagating in the light guide body 1(B) as a plurality of separate beams (from a plurality of positions in the y-directions along which the light propagates within the light guide body 1(B)). Therefore, if the first-order diffraction efficiency is high in the exit-side diffraction grating 12(B), a large amount of light exits in the first emission to occur during the propagation within the light guide body 1(B) and the amounts of light in the second and subsequent emissions greatly decrease. Therefore, it is preferable that the first-order diffraction efficiency of the exit-side diffraction grating 12(B) be lower than the first-order diffraction efficiency of the incident-side diffraction grating 11(B). Hence, in this exemplary embodiment, the grating height H12 of the exit-side diffraction grating 12(B) is lower than about 0.57 µm. Thus, the distribution of the amounts of light emitted from the exit-side diffraction grating 12(B) can be made appropriate.

In the blue-light guide body 1(B) configured as described above, since the incident-side diffraction grating 11(B) and the exit-side diffraction grating 12(B) have the same grating period P1, the beams that reach the exit-side diffraction grating 12(B) after propagating within the light guide body 1(B) by total reflection exit at an angle equal to the incident angle. That is, a plurality of lights that exit at an angle equal to the incident angle of incident light are produced. Note that although green light L(G) and red light L(R) are also incident on the blue-light guide body 1(B) at the same angle with the blue light L(B), the green light L(G) and the red light L(R), which are longer in wavelength than the blue light L(B), are diffracted at larger angles than the blue light L(B).

In FIG. 4 and FIG. 6, the blue light L(B), the green light L(G), and the red light L(R) emitted from the light guide body 1(B) for blue light are incident on the incident-side diffraction grating 11(G) of the green-light guide body 1(G) at the same incident angle as the light incident on the blue-light guide body 1(B). The grating period P2 of the incident-side diffraction grating 11(G) and the exit-side diffraction grating 12(G) of the green-light guide body 1(G) has been set so that both positive first-order diffracted light and negative first-order diffracted light from the light in a green wavelength band incident at an incident angle in the range of ±7° are diffracted with angles larger than the critical angle of the light guide body 1(G) and propagate within the light guide body 1(G) in both the positive y-direction and the negative y-direction from the incident position.

More concretely, the grating period P2 of the incident-side diffraction grating 11(G) and the exit-side diffraction grating 12(G) of the green-light guide body 1(G) have been set to 0.464 µm, so that the first-order diffraction angle for the shortest wavelength ($\lambda$cg=0.52 µm) in the wavelength band of the green light L(G) equals the critical angle (37.6°) of the light guide body 1(G) (refractive index=1.64). FIG. 6 shows beams in the case C41(G) where light of the shortest wavelength ($\lambda$cg=0.52 µm) in the wavelength band of the green light L(G) is incident on the green-light guide body 1(G) and beams in the case C42(G) where light of the longest wavelength (0.54 µm) in the wavelength band of the green light L(G) is incident on the green-light guide body 1(G). FIG. 6 also shows a situation of the case C43(G) combining the beams of the case C41(G) where light of the shortest wavelength ($\lambda$cg=0.52 µm) in the wavelength band of the green light L(G) is incident on the green-light guide body 1(G) and beams in the case C42(G) where light of the longest wavelength (0.54 µm) in the wavelength band of the green light L(G) is incident on the green-light guide body 1(G). As indicated in FIG. 6, the shortest wavelength and the longest wavelength in the wavelength band of the green light L(G) have only a difference of 0.02 µm, so that the difference between the diffraction angles for the shortest and longest wavelengths is small. Hence, the difference between the exit positions of the lights of the shortest and longest wavelengths is small.

Furthermore, as shown in FIG. 6, the grating height H21 of the incident-side diffraction grating 11(G) of the green-light guide body 1(G) has been set so that the first-order diffraction efficiency is high in the range between the shortest wavelength ($\lambda$cg=0.52 µm) and the longest wavelength (0.54 µm) in the wavelength band of the green light L(G). Furthermore, the grating height H21 of the incident-side diffraction grating 11(G) has been set to a height such that the first-order diffraction efficiency is high for the green light L(G) of the wavelength of 0.52 µm incident perpendicularly on the incident-side diffraction grating 11(G) and the diffraction efficiency is low for the blue light L(B) and the red light L(R) that are incident perpendicularly on the incident-side diffraction grating 11(G). In this exemplary embodiment, the grating height H21 of the incident-side diffraction grating 11(G) is, for example, about 0.60 µm. Furthermore, since it is preferable that the first-order diffraction efficiency of the exit-side diffraction grating be lower than the first-order diffraction efficiency of the incident-side diffraction grating, the grating height H22 of the exit-side diffraction grating 12(G) is lower than about 0.60 µm. Hence, the distribution of the amounts of light emitted from the exit-side diffraction grating 12(G) can be made appropriate.

In the green-light guide body 1(G) configured as described above, since the incident-side diffraction grating 11(G) and the exit-side diffraction grating 12(G) have the same grating period P2, the beams that reach the exit-side diffraction grating 12(G) after propagating within the light guide body 1(G) by total reflection exit at an angle equal to the incident angle. That is, a plurality of lights that exit at an angle equal to the incident angle of incident light are produced.

In FIG. 4 and FIG. 7, the blue light L(B), the green light L(G), and the red light L(R) emitted from the light guide body 1(G) for green light are incident on the incident-side diffraction grating 11(R) of the red-light guide body 1(R) at the same incident angle as the light incident on the blue-light guide body 1(B). The grating period P3 of the incident-side diffraction grating 11(R) and the exit-side diffraction grating 12(R) of the red-light guide body 1(R) has been set so that both positive first-order diffracted light and negative first-order diffracted light from the light in a red wavelength band incident at an incident angle in the range of ±7° are diffracted with angles larger than the critical angle of the light guide body 1(R) and propagate from the incident position to both sides, that is, in the positive y-direction and the negative y-direction, within the light guide body 1(R).

More concretely, the grating period P3 of the incident-side diffraction grating 11(R) and the exit-side diffraction grating 12(R) of the red-light guide body 1(R) have been set to 0.535 µm, so that the first-order diffraction angle for the shortest wavelength ($\lambda cr$=0.60 µm) in the wavelength band of the red light L(R) equals the critical angle (37.6°) of the light guide body 1(R) (refractive index=1.64). FIG. 7 shows beams in the case C41(R) where light of the shortest wavelength ($\lambda cr$=0.60 µm) in the wavelength band of the red light L(R) is incident on the red-light guide body 1(R) and beams in the case C42(R) where light of the longest wavelength (0.62 µm) in the wavelength band of the red light L(R) is incident on the red-light guide body 1(R). FIG. 7 also shows a situation of a case C43(R) combining the beams of the case C41(R) where light of the shortest wavelength ($\lambda cr$=0.60 µm) in the wavelength band of the red light L(R) is incident on the red-light guide body 1(R) and beams in the case C42(R) where light of the longest wavelength (0.62 µm) in the wavelength band of the red light L(R) is incident on the red-light guide body 1(R). As indicated in FIG. 7, the shortest wavelength and the longest wavelength in the wavelength band of the red light L(R) have only a difference of 0.02 µm, so that the difference between the diffraction angles for the shortest and longest wavelengths is small. Hence, the difference between the exit positions of the lights of the shortest and longest wavelengths is small.

Furthermore, the grating height H31 of the incident-side diffraction grating 11(R) of the red-light guide body 1(R) has been set so that the first-order diffraction efficiency is high in the range between the shortest wavelength ($\lambda cr$=0.60 µm) and the longest wavelength (0.62 µm) in the wavelength band of the red light L(R). Furthermore, the grating height H31 of the incident-side diffraction grating 11(R) has been set to a height such that the first-order diffraction efficiency is high for the red light L(R) of the wavelength of 0.60 µm incident perpendicularly on the incident-side diffraction grating 11(R) and the diffraction efficiency is low for the blue light and the green light that are incident perpendicularly on the incident-side diffraction grating 11(R). In this exemplary embodiment, the grating height H31 of the incident-side diffraction grating 11(R) is about 0.70 µm. Furthermore, since it is preferable that the first-order diffraction efficiency of the exit-side diffraction grating 12(R) be lower than the first-order diffraction efficiency of the incident-side diffraction grating 11(R), the grating height H32 of the exit-side diffraction grating 12(R) is lower than about 0.70 µm. Hence, the distribution of the amounts of light emitted from the exit-side diffraction grating 12(R) can be made appropriate.

In the red-light guide body 1(R) configured as described above, since the incident-side diffraction grating 11(R) and the exit-side diffraction grating 12(R) have the same grating period P3, the beams that reach the exit-side diffraction grating 12(R) after propagating within the light guide body 1(R) by total reflection exit at an angle equal to the incident angle. That is, a plurality of lights that exit at an angle equal to the incident angle of incident light are produced. Since the grating heights of the diffraction gratings of the red-light guide body 1(R) have been set so that the diffraction efficiency is high for the wavelength of the red light L(R), the diffraction efficiency is low for the blue light L(B) and the green light (LG). Hence, influence of unnecessary diffracted light can be restrained.

In the luminous flux diameter expanding element 10 of the exemplary embodiment, the blue light L(B), the green light L(G), and the red light L(R) emitted from the blue-light guide body 1(B) are incident on the green-light guide body 1(G) and the red-light guide body 1(R) in order and are diffracted by the diffraction gratings provided on the green-light guide body 1(G) and the red-light guide body 1(R). The blue light L(B), the green light L(G), and the red light L(R) emitted from the green-light guide body 1(G) are then incident on the red-light guide body 1(R) and are diffracted by the diffraction gratings provided on the red-light guide body 1(R). In this process, the green-light guide body 1(G) and the red-light guide body 1(R) also emit unnecessary diffracted lights other than lights at necessary angles. If the diffraction angles of unnecessary diffracted lights are sufficiently larger than 7°, the unnecessary diffracted lights can be blocked or absorbed.

Main Advantageous Effects of the Exemplary Embodiment

As described above, the luminous flux diameter expanding element 10 of the exemplary embodiment emits light while sufficiently expanding the luminous flux diameter, because the light guide bodies 1(B), 1(G), and 1(R) each have a configuration as described above in conjunction with Exemplary Embodiment 1. Therefore, the size increase of the luminous flux diameter expanding element can be restrained and high light use efficiency is achieved. Furthermore, since the grating periods of the blue-light guide body 1(B), the green-light guide body 1(G), and the red-light guide body 1(R) have been set as described above, the angles of beams that propagate within the light guide bodies 1(B), 1(G), and 1(R) can be set to the same angles. Therefore, if the light guide bodies 1(B), 1(G), and 1(R) have the same thickness, the intervals of the beams of the blue light L(B), the green light L(G), and the red light L(R) emitted from the luminous flux diameter expanding element 10 can be made equal, so that the distributions of amounts of emission of the color lights can be made equal to each other. Therefore, occurrence of color unevenness within an emitted luminous flux can be restrained. Furthermore, since the light guide bodies 1(R), 1(G), and 1(B) are disposed in order from the shortest to the longest of the wavelengths of light to which the light guide bodies 1(R), 1(G), and 1(B) correspond, occurrence of unnecessary diffracted light can be restrained.

Note that the spectrum range of 0.02 µm of each of the blue light, the green light, and the red light can be realized by, for example, inserting band-pass filters between LEDs as a light source and a liquid crystal apparatus described later. Furthermore, if an organic electroluminescence apparatus is used, the foregoing spectrum range can be realized by providing the organic electroluminescence elements with an optical microresonator structure.

Exemplary Embodiment 3

Figure 8:
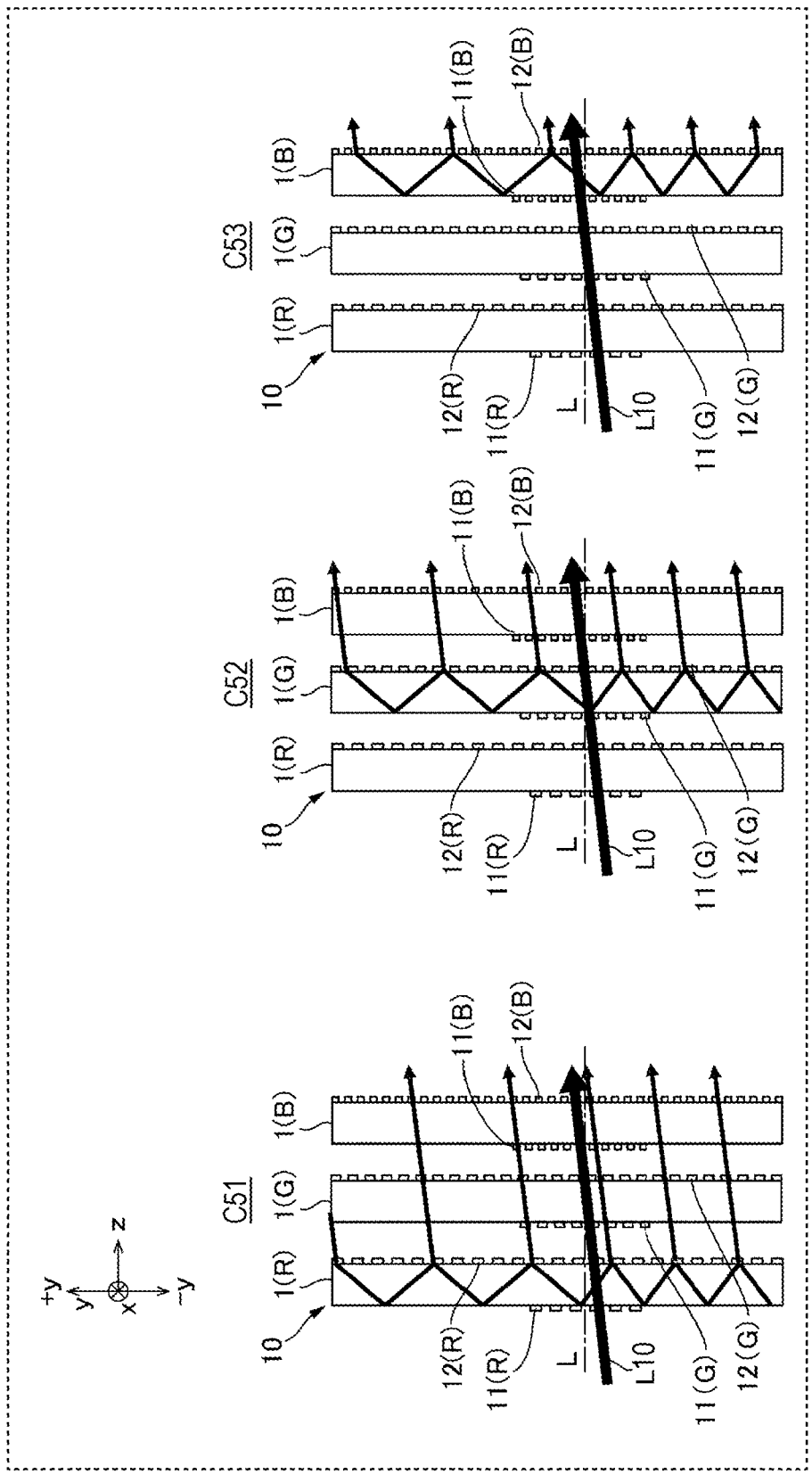
FIG. 8 is an illustrative diagram showing a form of a luminous flux diameter expanding element according to Exemplary Embodiment 3.

FIG. 8 is an illustrative diagram showing a form of a luminous flux diameter expanding element 10 according to Exemplary Embodiment 3. In FIG. 8, a left portion of the drawing shows a state C51 in which the luminous flux diameter of red light L(R) is expanded, a right portion of the drawing shows a state C53 in which the luminous flux diameter of blue light L(B) is expanded, and a central portion of the drawing shows a state C52 in which the luminous flux diameter of green light L(G) is expanded. This exemplary embodiment has substantially the same basic configuration as Exemplary Embodiment 2. Therefore, comparable portions are assigned with the same reference characters as in Exemplary Embodiment 2 and descriptions thereof will be omitted.

In the foregoing luminous flux diameter expanding element 10 according Exemplary Embodiment 2, the blue-light guide body 1(B), the green-light guide body 1(G), and the red-light guide body 1(R) are disposed in order from the incident side and the exit side for image light along the optical axis L. In the luminous flux diameter expanding element 10 of this exemplary embodiment, on the other hand, as shown in FIG. 8, the red-light guide body 1(R), the green-light guide body 1(G), the blue-light guide body 1(B) are disposed in order from the incident side to the exit side for image light along the optical axis L. That is, the light guide bodies 1(R), 1(G), and 1(B) are disposed in order from the longest to the shortest of the wavelengths of light to which the light guide bodies 1(R), 1(G), and 1(B) correspond.

Therefore, component elements of the luminous flux diameter expanding element 10 of the exemplary embodiment have the following relations with component elements of the embodiment.

The light guide body 1(R) corresponds to a first light guide body.

The surface 1a(R) corresponds to a first surface.

The surface 1b(R) corresponds to a second surface. The incident-side diffraction grating 11(R) corresponds to a first incident-side diffraction grating.

The exit-side diffraction grating 12(R) corresponds to a first exit-side diffraction grating.

The light guide body 1(G) corresponds to a second light guide body.

The surface 1a(G) corresponds to a third surface.

The surface 1b(G) corresponds to a fourth surface. The incident-side diffraction grating 11(G) corresponds to a second incident-side diffraction grating.

The exit-side diffraction grating 12(G) corresponds to a second exit-side diffraction grating.

The light guide body 1(B) corresponds to a third light guide body.

The surface 1a(B) corresponds to a fifth surface.

The surface 1b(B) corresponds to a sixth surface.

The incident-side diffraction grating 11(B) corresponds to a third incident-side diffraction grating.

The exit-side diffraction grating 12(B) corresponds to a third exit-side diffraction grating.

The red light L(R) corresponds to a first beam.

The green light L(G) corresponds to a second beam.

The blue light L(B) corresponds to a third beam.

Other configurations are substantially the same as those of the light guide body described above with reference to FIG. 3 and descriptions thereof will be omitted. This luminous flux diameter expanding element 10 achieves substantially the same advantageous effects as the luminous flux diameter expanding element 10 according to Exemplary Embodiment 2, such as an advantageous effect of being able to make the distributions of amounts of emission of color lights equal to each other as in Exemplary Embodiment 2.

Exemplary Embodiment 4

Figure 9:
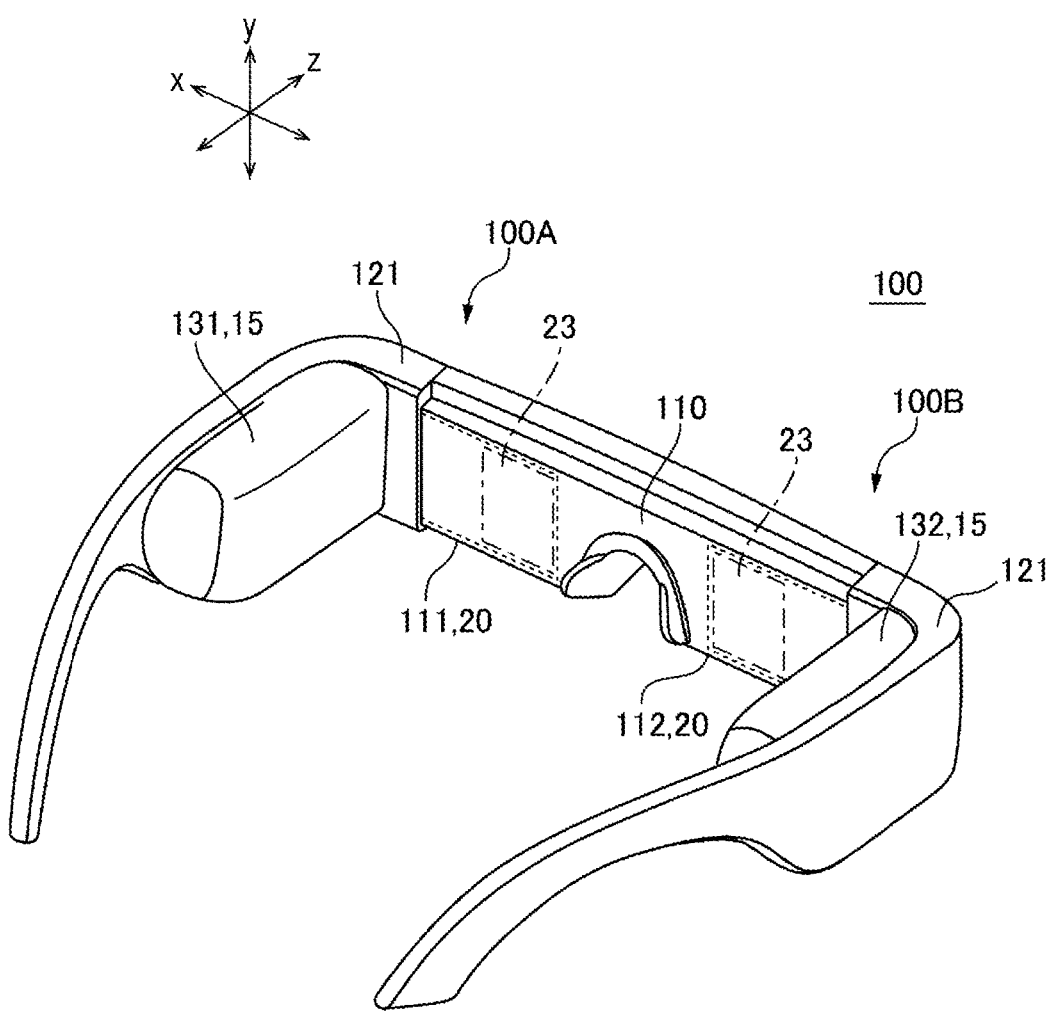
FIG. 9 is an illustrative diagram showing a configuration example of a display apparatus equipped with a luminous flux diameter expanding element to which the embodiment has been applied.
Figure 10:
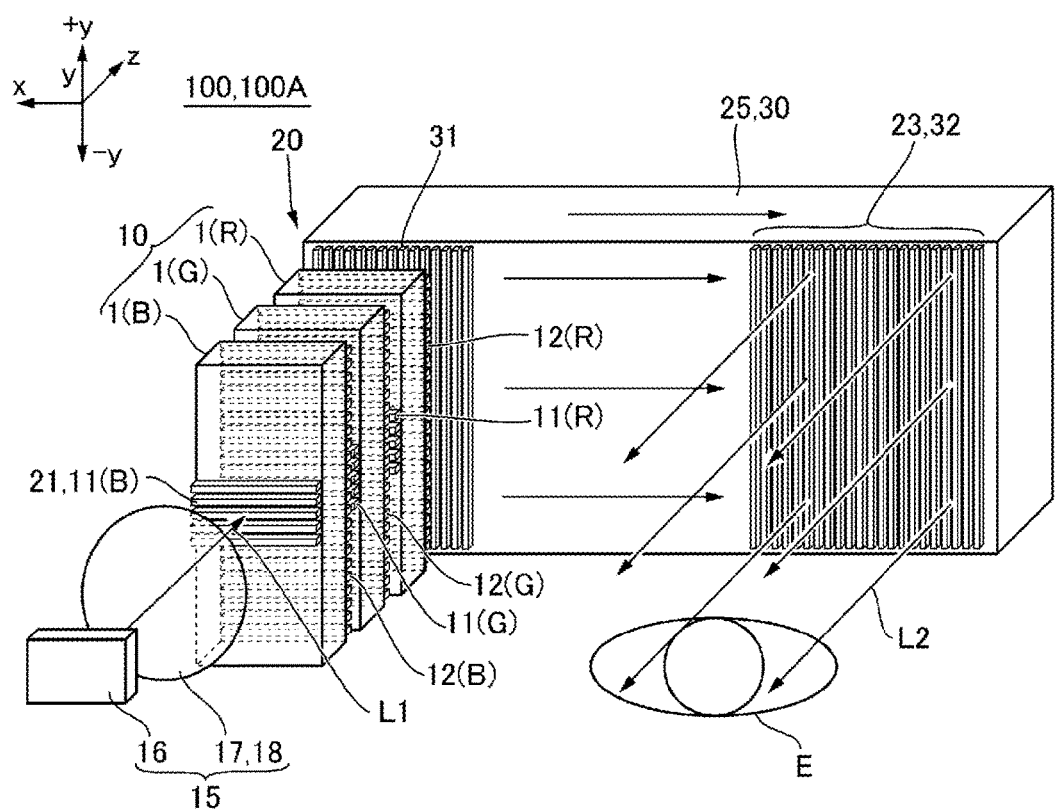
FIG. 10 is an illustrative diagram showing an optical system of the display apparatus shown in FIG. 9.
Figure 11:
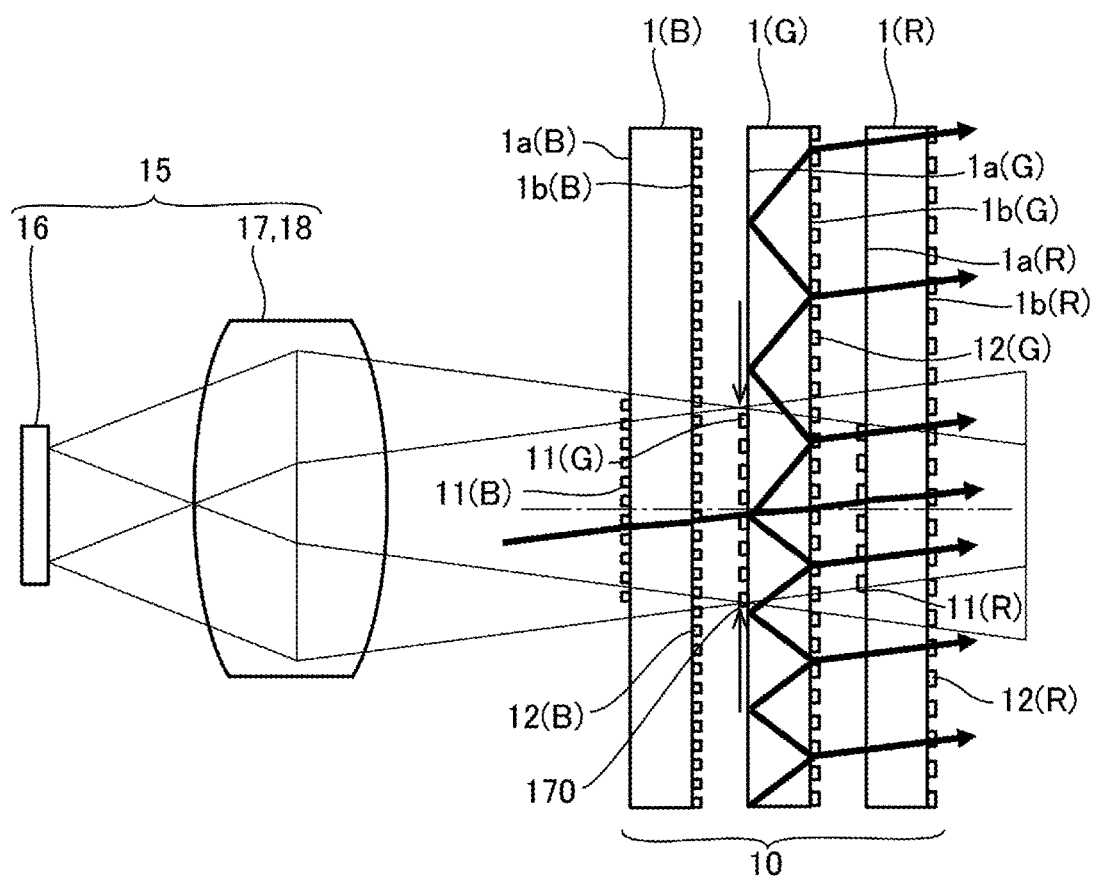
FIG. 11 is an illustrative diagram of an exit pupil of the optical system shown in FIG. 10.

FIG. 9 is an illustrative diagram showing a configuration example of a display apparatus equipped with a luminous flux diameter expanding element 10 to which the embodiment has been applied. FIG. 10 is an illustrative diagram showing an optical system of the display apparatus shown in FIG. 9. FIG. 11 is an illustrative diagram of an exit pupil of the optical system shown in FIG. 10.

A display apparatus 100 shown in FIG. 9 is a head mount display (head-mounted type display apparatus) that has an external appearance similar to that of a pair of eye glasses. The display apparatus 100 is capable of causing an observer wearing the display apparatus 100 to recognize image light and allowing the observer to observe images of the outside world in a see-through state. The display apparatus 100 includes an optical panel 110 that covers a front of the observer's eyes, a frame 121 that supports the optical panel 110, and a first driving unit 131 and a second driving unit 132 that are provided on side frame portions of the frame 121. The optical panel 110 includes a first panel portion 111 and a second panel portion 112. The first panel portion 111 and the second panel portion 112 are integrally interconnected by a central portion of the optical panel 110 to form a platy component part. A first display apparatus 100A combining the first panel portion 111 and a first driving unit 131 shown on the left side in the drawing of FIG. 9 is provided for the observer's left eye and capable of functioning as a virtual image display apparatus even when operating alone. A second display apparatus 100B combining the second panel portion 112 and a second driving unit 132 shown on the right side in the drawing is provided for the observer's right eye and capable of functioning as a virtual image display apparatus even when operating alone.

Note that the second display apparatus 100B has substantially the same structure as the first display apparatus 100A, that is, has a structure that is a mere left-to-right inversion of the structure of the first display apparatus 100A. Therefore, in the following description, the first display apparatus 100A will be mainly described and detailed descriptions of the second display apparatus 100B will be omitted.

As shown in FIG. 10, the first display apparatus 100A includes an image light projection apparatus 15 and a light guide optical apparatus 20. The image light projection apparatus 15 corresponds to the first driving unit 131 in FIG. 9 and the light guide optical apparatus 20 corresponds to the first panel portion 111 in FIG. 9. Incidentally, in the second display apparatus 100B shown in FIG. 9, the image light projection apparatus 15 corresponds to the second driving unit 132 and the light guide optical apparatus 20 corresponds to the second panel portion 112.

The image light projection apparatus 15 includes an image forming apparatus 16 and a projection optical system 17. The image forming apparatus 16 includes, although not graphically shown, an illuminator apparatus that emits two-dimensional illumination light, a transmission type liquid crystal display device, and a drive control portion that controls the operations of the illuminator apparatus and the liquid crystal display device. The illuminator apparatus produces light that contains three colors, that is, red, green, and blue. The liquid crystal display device forms an image light L1 that is to be a display object, such as a moving picture by spatially modulating illumination light from the illuminator apparatus.

In this exemplary embodiment, the projection optical system 17 includes a collimator lens 18 that has such a power as to condense beams of the image light L1 emitted from dots on the image forming apparatus 16 (liquid crystal display device). Incidentally, the image forming apparatus 16 may be a reflection type space light modulator that forms an image by reflecting light from the light source by using mirrors of an MEMS (microelectromechanical system) or the like, or organic electroluminescence display elements.

The light guide optical apparatus 20 includes an irradiated region 21 that is irradiated with the image light L1 and a display light emission region 23 that emits, as display light L2, light coming in from the irradiated region 21.

In this exemplary embodiment, the light guide optical apparatus 20 includes a luminous flux diameter expanding element 10 and a light guide optical system 25 that guides the image light L1 emitted from the luminous flux diameter expanding element 10 in the x-direction (second direction) that intersects with the y-directions (first directions). The luminous flux diameter expanding element 10 is a luminous flux diameter expanding element to which the embodiment has been applied and has, for example, a configuration as described above with reference to Exemplary Embodiment 2. The light guide optical system 25 includes a light guide body 30 that extends in the x-direction. The light guide body 30 includes an incident-side diffraction grating 31 that is provided in an end portion of the light guide body 30 at one side in the x-direction and that faces the luminous flux diameter expanding element 10 and an exit-side diffraction grating 32 that is provided an another end portion of the light guide body 30 at the other side in the x-direction and that faces an eye E. The exit-side diffraction grating 32 forms the display light emission region 23.

Note that the size of the luminous flux diameter expanding element 10 in the y-directions is smaller than the size of the light guide optical system 25 (the light guide body 30) in the y-directions. Therefore, the luminous flux diameter expanding element 10 does not protrude in the y-directions from the light guide optical system 25 (the light guide body 30).

In this exemplary embodiment, the y-directions (first direction) correspond to a vertical direction. In the luminous flux diameter expanding element 10, the three light guide bodies (the blue-light guide body 1(B), the green-light guide body 1(G), and the red-light guide body 1(R)) each extend in the vertical direction (y-directions). Furthermore, the three light guide body (the blue-light guide body 1(B), the green-light guide body 1(G), and the red-light guide body 1(R)) are each provided with an incident-side diffraction grating 11(B), 11(G) or 11(R) whose gratings extend in the x-direction and an exit-side diffraction grating 12(B), 12(G) or 12(R) whose gratings extend in the x-direction.

Therefore, the image light L1 emitted from the image light projection apparatus 15 is incident on the luminous flux diameter expanding element 10, expanded in the luminous flux diameter in the vertical direction (y-directions) by the luminous flux diameter expanding element 10, and then emitted to the incident-side diffraction grating 31 of the light guide body 30. Then, light comes into the light guide body 30 through the incident-side diffraction grating 31, propagates in the x-direction (second direction) within the light guide body 30, and is emitted from the exit-side diffraction grating 32 of the light guide body 30 to the eye E. In this process, exit pupil expanding of the light in a lateral direction (x-direction) is accomplished.

Note that in the image light projection apparatus 15, as shown in FIG. 11, the image light emitted from the image forming apparatus 16 is converted into parallel light by the collimator lens 18 of the projection optical system 17. Also note that an exit pupil 170 of the projection optical system 17 is positioned, in the optical axis direction, between the incident surface of the luminous flux diameter expanding element 10 (the surface 1a(B) of the blue-light guide body 1(B)) and the exit surface of the luminous flux diameter expanding element 10 (the surface 1b(R) of the red-light guide body 1(R)). In this exemplary embodiment, the exit pupil 170 of the projection optical system 17 is positioned in the surface 1a(G) of the green-light guide body 1(G). Therefore, the light in the entire view angle of the image light L1 can be caused to be incident on the incident-side diffraction gratings 11(B), 11(G) and 11(R) of the blue-light guide body 1(B), the green-light guide body 1(G), and the red-light guide body 1(R) that are used in the luminous flux diameter expanding element 10. Hence, images of all of the blue light L(B), the green light L(G), and the red light L(R) can be displayed over the entire screen. Note that it is preferable that the exit pupil 170 of the projection optical system 17 be positioned at an intermediate position in the optical axis direction between the incident surface of the luminous flux diameter expanding element 10 (the surface 1a(B) of the blue-light guide body 1(B)) and the exit surface of the luminous flux diameter expanding element 10 (the surface 1b(R) of the red-light guide body 1(R)). According to the foregoing configuration, the light in the entire view angle of the image light L1 can be more certainly caused to be incident on the incident-side diffraction gratings 11(B), 11(G), and 11(R) of the blue-light guide body 1(B), the green-light guide body 1(G), and the red-light guide body 1(R) that are used in the luminous flux diameter expanding element 10. Therefore, images of all of the blue light L(B), the green light L(G), and the red light L(R) can be more certainly displayed over the entire screen.

Exemplary Embodiment 5

Figure 12:
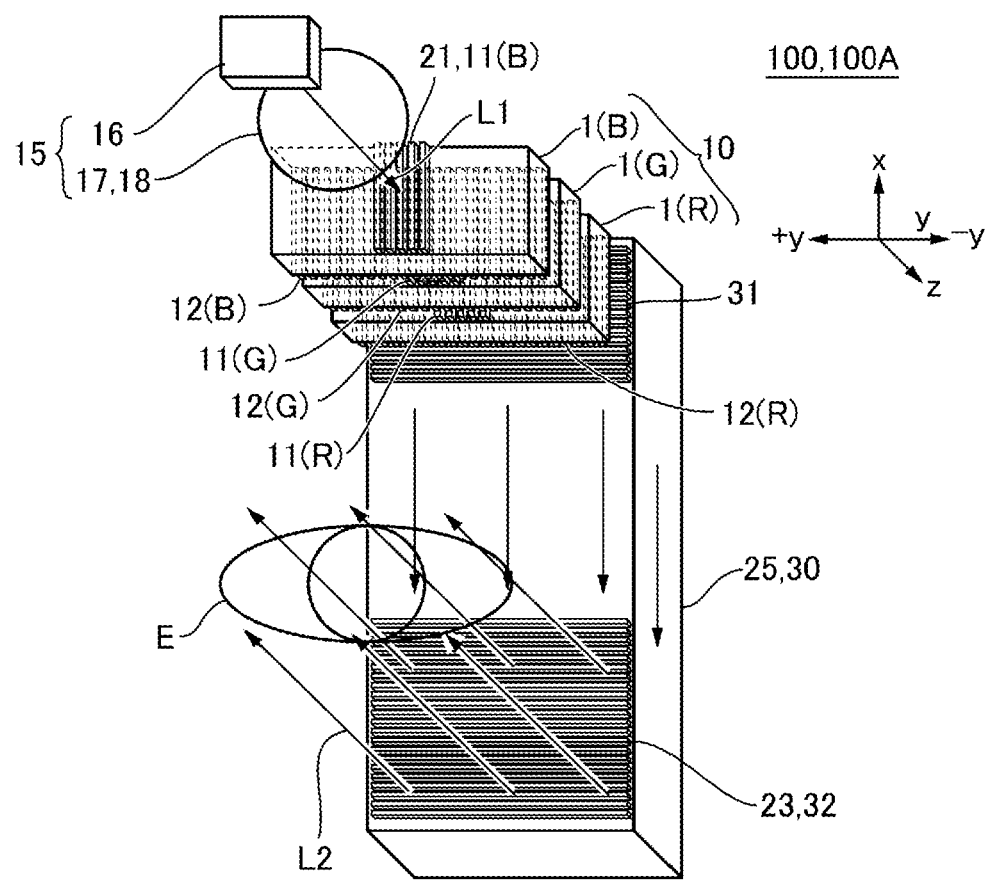
FIG. 12 is an illustrative diagram showing another configuration example of a display apparatus equipped with a luminous flux diameter expanding element to which the embodiment has been applied.

FIG. 12 is an illustrative diagram showing another configuration example of a display apparatus that includes a luminous flux diameter expanding element 10 to which the embodiment has been applied. A basic configuration of this exemplary embodiment is substantially the same as that of Exemplary Embodiment 4; therefore, comparable portions are assigned with the same reference characters and detailed descriptions thereof are omitted.

As shown in FIG. 12, in a first display apparatus 100A of this exemplary embodiment, too, an image light projection apparatus 15 includes an image forming apparatus 16 and a projection optical system 17 as in Exemplary Embodiment 4. A light guide optical apparatus 20 includes a luminous flux diameter expanding element 10 and a light guide optical system 25 that guides image light L1 emitted from the luminous flux diameter expanding element 10 in the x-direction (second direction) that intersects with the y-directions (first direction). The luminous flux diameter expanding element 10 is a luminous flux diameter expanding element to which the embodiment has been applied, and has, for example, a configuration as described above with reference to Exemplary Embodiment 2. The light guide optical system 25 includes a light guide body 30 that extends in the x-direction. Note that the size of the luminous flux diameter expanding element 10 in the y-directions is smaller than the size of the light guide optical system 25 (the light guide body 30) in the y-directions. Therefore, the luminous flux diameter expanding element 10 does not protrude in the y-directions from the light guide optical system 25 (the light guide body 30).

In this exemplary embodiment, the y-directions (first direction) correspond to a lateral direction. In the luminous flux diameter expanding element 10, the light guide bodies (the blue-light guide body 1(B), the green-light guide body 1(G), and the red-light guide body 1(R)) each extend in the lateral direction (y-directions). Furthermore, the x-direction (second direction) corresponds to a vertical direction. The light guide body 30 extends in the vertical direction (x-direction).

In the first display apparatus 100A configured as described above, similar to Exemplary Embodiment 4, the image light L1 emitted from the image light projection apparatus 15 is incident on the luminous flux diameter expanding element 10, expanded in the luminous flux diameter in the lateral direction (y-directions) by the luminous flux diameter expanding element 10, and then emitted to the incident-side diffraction grating 31 of the light guide body 30. Then, light comes into the light guide body 30 through the incident-side diffraction grating 31, propagates in the x-direction (second direction) within the light guide body 30, and is emitted from the exit-side diffraction grating 32 of the light guide body 30 to the eye E. In this process, exit pupil expanding of the light in the vertical direction (x-direction) is accomplished.

Other Exemplary Embodiments

Although in Exemplary Embodiments 2, 3, 4, and 5, the luminous flux diameter expanding element 10 includes three light guide bodies, a configuration that includes only two light guide bodies may also be adopted. In this case, of the two light guide bodies, for example, one light guide body expands the luminous flux diameter of the blue light L(B) and the green light L(G) and the other light guide body expands the luminous flux diameter of the red light L(R).

The entire disclosure of Japanese Patent Application No. 2015-217346, filed Nov. 5, 2015 is expressly incorporated by reference herein.

What is claimed is:

1. A luminous flux diameter expanding element comprising:
   a first light guide body that has a first surface and a second surface that is a surface on an opposite side to the first surface;
   a first incident-side diffraction grating provided on the first surface; and
   a first exit-side diffraction grating provided on the second surface,
   wherein the first surface is parallel to the second surface, and
   wherein
      the first incident-side diffraction grating and the first exit-side diffraction grating are provided so as to have mutually equal grating directions and mutually equal grating periods,
      the first light guide body has such a refractive index that when a first beam is incident on the first incident-side, a diffraction angle of a positive first-order diffracted light of the first beam and the diffraction angle of a negative first-order diffracted light of the first beam are each greater than or equal to a critical angle, and
      when it is assumed that a direction that intersects with the grating direction of the first incident-side diffraction grating is a first direction, the positive first-order diffracted light and the negative first-order diffracted light of the first beam diffracted by the first incident-side diffraction grating are caused to propagate in mutually opposite directions along the first direction within the first light guide body and are emitted from the first exit-side diffraction grating.

2. The luminous flux diameter expanding element according to claim 1, further comprising:
   a second light guide body that has a third surface that faces the second surface of the first light guide body and a fourth surface that is a surface on an opposite side to the third surface;
   a second incident-side diffraction grating provided on the third surface; and
   a second exit-side diffraction grating provided on the fourth surface,
   wherein
      the third surface is parallel to the fourth surface,
      the second incident-side diffraction grating and the second exit-side diffraction grating are provided so as to have mutually equal grating directions and mutually equal grating periods,
      the grating direction of the second incident-side diffraction grating is equal to the grating direction of the first incident-side diffraction grating,
      the grating period of the second incident-side diffraction grating is different from the grating period of the first incident-side diffraction grating,
      the second light guide body has such a refractive index that when a second beam different in wavelength from the first beam is incident on the second incident-side diffraction grating, the diffraction angle of the positive first-order diffracted light of the second beam and the diffraction angle of the negative first-order diffracted light of the second beam are each greater than or equal to a critical angle, and
      the positive first-order diffracted light and the negative first-order diffracted light of the second beam diffracted by the second incident-side diffraction grating are caused to propagate in the mutually opposite directions along the first direction within the second light guide body and are emitted from the second exit-side diffraction grating.

3. The luminous flux diameter expanding element according to claim 2, further comprising:
   a third light guide body that has a fifth surface that faces the fourth surface of the second light guide body and a sixth surface that is a surface on an opposite side to the fifth surface;
   a third incident-side diffraction grating provided on the fifth surface; and
   a third exit-side diffraction grating provided on the sixth surface,
   wherein
      the fifth surface is parallel to the sixth surface,
      the third incident-side diffraction grating and the third exit-side diffraction grating are provided so as to have mutually equal grating directions and mutually equal grating periods,
      the grating direction of the third incident-side diffraction grating is equal to the grating direction of the first incident-side diffraction grating,
      the grating period of the third incident-side diffraction grating is different from the grating period of the first incident-side diffraction grating and the grating period of the second incident-side diffraction grating,
      the third light guide body has such a refractive index that when a third beam different in wavelength from the first beam and the second beam is incident on the third incident-side diffraction grating, the diffraction angle of the positive first-order diffracted light of the third beam and the diffraction angle of the negative first-order diffracted light of the third beam are each greater than or equal to a critical angle, and
      the positive first-order diffracted light and the negative first-order diffracted light of the third beam diffracted by the third incident-side diffraction grating are caused to propagate in the mutually opposite directions along the first direction within the third light guide body and are emitted from the third exit-side diffraction grating.

4. The luminous flux diameter expanding element according to claim 3,
wherein, when it is assumed that the grating period of the first incident-side diffraction grating is P1, and that the grating period of the second incident-side diffraction grating is P2, and that the grating period of the third incident-side diffraction grating is P3, the grating period P1, the grating period P2, and the grating period P3 satisfy the following relation:

P1<P2<P3.

5. The luminous flux diameter expanding element according to claim 3,
wherein, when it is assumed that a grating height of the first incident-side diffraction grating is H11, and that the grating height of the second incident-side diffraction grating is H21, and that the grating height of the third incident-side diffraction grating is H31, the grating height H11, the grating height H21, and the grating height H31 satisfy the following relation:

H11<H21<H31.

6. The luminous flux diameter expanding element according to claim 5,
wherein, when it is assumed that the grating height of the first exit-side diffraction grating is H12, and that the grating height of the second exit-side diffraction grating is H22, and that the grating height of the third exit-side diffraction grating is H32, the grating height H11, the grating height H12, the grating height H21, the grating height H22, the grating height H31, and the grating height H32 satisfy the following relation:

H12<H11<H22<H21<H32<H31.

7. The luminous flux diameter expanding element according to claim 1,
wherein, when it is assumed the grating period of the first incident-side diffraction grating and the first exit-side diffraction grating is P, and that a shortest wavelength in a spectrum of the first beam in terms of half-width is λc, and that a maximum incident angle of the first beam with respect to the first incident-side diffraction grating is θmax, the grating period P, the shortest wavelength λc, and the maximum incident angle θmax satisfy the following relation:

P≤λc/[sin(θmax) +1].

8. A display apparatus comprising:
the luminous flux diameter expanding element according to claim 1;
an image light projection apparatus that includes an image generation apparatus and a collimator lens and that causes image light generated by the image generation apparatus to be incident on the luminous flux diameter expanding element via the collimator lens; and
a light guide optical system that guides the image light emitted from the luminous flux diameter expanding element into a second direction that intersects with the first direction.

9. A display apparatus comprising:
the luminous flux diameter expanding element according to claim 2;
an image light projection apparatus that includes an image generation apparatus and a collimator lens and that causes image light generated by the image generation apparatus to be incident on the luminous flux diameter expanding element via the collimator lens; and
a light guide optical system that guides the image light emitted from the luminous flux diameter expanding element into a second direction that intersects with the first direction.

10. A display apparatus comprising:
the luminous flux diameter expanding element according to claim 3;
an image light projection apparatus that includes an image generation apparatus and a collimator lens and that causes image light generated by the image generation apparatus to be incident on the luminous flux diameter expanding element via the collimator lens; and
a light guide optical system that guides the image light emitted from the luminous flux diameter expanding element into a second direction that intersects with the first direction.

11. A display apparatus comprising:
the luminous flux diameter expanding element according to claim 4;
an image light projection apparatus that includes an image generation apparatus and a collimator lens and that causes image light generated by the image generation apparatus to be incident on the luminous flux diameter expanding element via the collimator lens; and
a light guide optical system that guides the image light emitted from the luminous flux diameter expanding element into a second direction that intersects with the first direction.

12. A display apparatus comprising:
the luminous flux diameter expanding element according to claim 5;
an image light projection apparatus that includes an image generation apparatus and a collimator lens and that causes image light generated by the image generation apparatus to be incident on the luminous flux diameter expanding element via the collimator lens; and
a light guide optical system that guides the image light emitted from the luminous flux diameter expanding element into a second direction that intersects with the first direction.

13. A display apparatus comprising:
the luminous flux diameter expanding element according to claim 6;
an image light projection apparatus that includes an image generation apparatus and a collimator lens and that causes image light generated by the image generation apparatus to be incident on the luminous flux diameter expanding element via the collimator lens; and
a light guide optical system that guides the image light emitted from the luminous flux diameter expanding element into a second direction that intersects with the first direction.

14. A display apparatus comprising:
the luminous flux diameter expanding element according to claim 7;
an image light projection apparatus that includes an image generation apparatus and a collimator lens and that causes image light generated by the image generation apparatus to be incident on the luminous flux diameter expanding element via the collimator lens; and
a light guide optical system that guides the image light emitted from the luminous flux diameter expanding element into a second direction that intersects with the first direction.

15. The display apparatus according to claim 8,
wherein an exit pupil of the image light projection apparatus is positioned between an incident surface of the luminous flux diameter expanding element and an exit surface of the luminous flux diameter expanding element.

16. The display apparatus according to claim 15,
wherein the exit pupil is positioned at an intermediate position between the incident surface and the exit surface of the luminous flux diameter expanding element.

17. The display apparatus according to claim 8,
wherein a size of the luminous flux diameter expanding element in the first direction is smaller than the size of the light guide optical system in the first direction.

18. The display apparatus according to claim 8, wherein
the first direction is a vertical direction relative to the display apparatus, and
the second direction is a lateral direction relative to the display apparatus.

19. The display apparatus according to claim 8, wherein
the first direction is a lateral direction relative to the display apparatus, and
the second direction is a vertical direction relative to the display apparatus.

* * * * *